United States Patent
Ohtake

(10) Patent No.: US 12,345,863 B2
(45) Date of Patent: Jul. 1, 2025

(54) OPTICAL SYSTEM, OPTICAL APPARATUS AND METHOD FOR MANUFACTURING THE OPTICAL SYSTEM

(71) Applicant: Nikon Corporation, Tokyo (JP)

(72) Inventor: Fumiaki Ohtake, Tokyo (JP)

(73) Assignee: Nikon Corporation, Tokyo (JP)

( * ) Notice: Subject to any disclaimer, the term of this patent is extended or adjusted under 35 U.S.C. 154(b) by 300 days.

(21) Appl. No.: 17/783,632

(22) PCT Filed: Nov. 17, 2020

(86) PCT No.: PCT/JP2020/042794
§ 371 (c)(1),
(2) Date: Jun. 8, 2022

(87) PCT Pub. No.: WO2021/117429
PCT Pub. Date: Jun. 17, 2021

(65) Prior Publication Data
US 2023/0023567 A1    Jan. 26, 2023

(30) Foreign Application Priority Data

Dec. 10, 2019    (JP) ................................. 2019-223170

(51) Int. Cl.
*G02B 15/177* (2006.01)
*B29D 11/00* (2006.01)
*G02B 15/14* (2006.01)

(52) U.S. Cl.
CPC ...... *G02B 15/177* (2013.01); *B29D 11/00009* (2013.01); *G02B 15/145507* (2019.08)

(58) Field of Classification Search
USPC ................................. 359/676–684, 686, 689
See application file for complete search history.

(56) References Cited

U.S. PATENT DOCUMENTS

| 5,668,668 A | 9/1997 | Shibayama et al. |
| 5,721,642 A | 2/1998 | Shibayama et al. |

(Continued)

FOREIGN PATENT DOCUMENTS

| JP | H08-248314 A | 9/1996 |
| JP | H10-039210 A | 2/1998 |

(Continued)

OTHER PUBLICATIONS

Office Action issued Jun. 4, 2024, in Japanese Patent Application No. 2023-138708.

(Continued)

*Primary Examiner* — Darryl J Collins
(74) *Attorney, Agent, or Firm* — Potomac Law Group, PLLC

(57) ABSTRACT

An optical system (OL) formed from a preceding lens group (GA) having a negative refractive power, and a succeeding lens group (GB) having a positive refractive power, the lens groups being arranged in order from the object side along the optical axis. The succeeding lens group (GB) has: a focusing group (GF) having a positive refractive power, the focusing group (GF) being positioned furthest toward the object side of the succeeding lens group (GB); and an image-side group (GC) positioned further toward the image side than the focusing group (GF). During focusing from an infinitely distant object to a short-distance object, the focusing group (GF) moves toward the image side along the optical axis and satisfies the following conditional expression.

$$0.78 < fB/fC < 1.00$$

In this conditional expression,
fB is the focal distance of the succeeding lens group GB, and
fC is the focal distance of the image-side group GC.

28 Claims, 8 Drawing Sheets

(56) References Cited

U.S. PATENT DOCUMENTS

| | | | |
|---|---|---|---|
| 5,798,871 A | 8/1998 | Shibayama et al. | |
| 5,835,272 A | 11/1998 | Kodama | |
| 8,934,176 B2* | 1/2015 | Yamagami | G02B 27/646 |
| | | | 359/691 |
| 2009/0268308 A1* | 10/2009 | Masugi | G02B 15/143507 |
| | | | 359/716 |
| 2010/0196003 A1 | 8/2010 | Miyazaki et al. | |
| 2012/0069441 A1 | 3/2012 | Fujimoto et al. | |
| 2017/0068079 A1 | 3/2017 | Kawamura et al. | |
| 2017/0075095 A1* | 3/2017 | Kimura | G02B 15/144511 |
| 2017/0293124 A1 | 10/2017 | Kawamura | |
| 2018/0164556 A1* | 6/2018 | Ohishi | G02B 15/20 |
| 2018/0196241 A1* | 7/2018 | Shibayama | G02B 15/1465 |
| 2018/0210179 A1 | 7/2018 | Kawamura et al. | |
| 2019/0302409 A1 | 10/2019 | Shomura | |
| 2019/0369371 A1 | 12/2019 | Katou et al. | |
| 2020/0333621 A1 | 10/2020 | Harada | |
| 2023/0023567 A1 | 1/2023 | Ohtake | |

FOREIGN PATENT DOCUMENTS

| | | |
|---|---|---|
| JP | 2010-176099 A | 8/2010 |
| JP | 2012-068303 A | 4/2012 |
| JP | 2015-203734 A | 11/2015 |
| JP | 2017-122743 A | 7/2017 |
| JP | 2017-122745 A | 7/2017 |
| JP | 2017-187631 A | 10/2017 |
| JP | 2018-010219 A | 1/2018 |
| JP | 2018-077320 A | 5/2018 |
| JP | 2018-189733 A | 11/2018 |
| JP | 2019-066701 A | 4/2019 |
| JP | 2019-117419 A | 7/2019 |
| JP | 2019-174714 A | 10/2019 |
| JP | 2019-197130 A | 11/2019 |
| WO | WO2016/121944 A1 | 1/2015 |
| WO | 2018/139160 A1 | 8/2018 |
| WO | WO 2019/116563 A1 | 6/2019 |
| WO | 2021/117429 A1 | 6/2021 |

OTHER PUBLICATIONS

Office Action issued Oct. 4, 2022, in Japanese Patent Application No. 2021-563814.

Decision of Dismissal of Amendment issued Jun. 13, 2023, in Japanese Patent Application No. 2021-563814.

Decision of Refusal issued Jun. 13, 2023, in Japanese Patent Application No. 2021-563814.

Office Action issued Jun. 1, 2023, in Chinese Patent Application No. 202080083790.8.

Office Action issued Jan. 27, 2024, in Chinese Patent Application No. 202080083790.8.

Office Action issued Feb. 14, 2023, in Japanese Patent Application No. 2021-563814.

International Search Report from International Patent Application No. PCT/JP2020/042794, Feb. 2, 2021.

International Preliminary Report on Patentability from International Patent Application No. PCT/JP2020/042794, Jun. 23, 2022.

Office Action issued Mar. 18, 2025, in Japanese Patent Application No. 2024-177545.

* cited by examiner

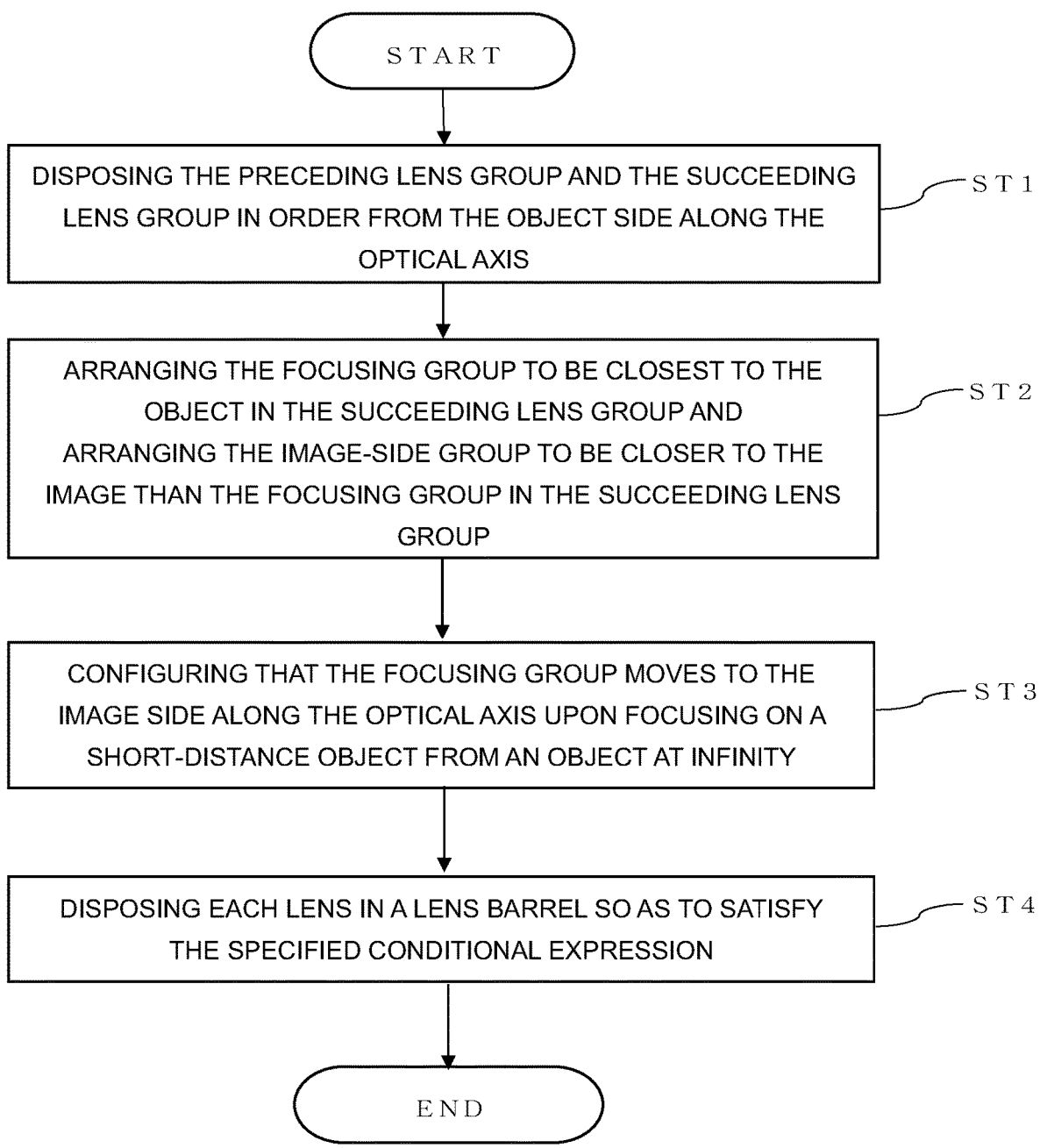

OPTICAL SYSTEM, OPTICAL APPARATUS AND METHOD FOR MANUFACTURING THE OPTICAL SYSTEM

TECHNICAL FIELD

The present invention relates to an optical system, an optical apparatus and a method for manufacturing the optical system.

TECHNICAL BACKGROUND

Optical systems suitable for photographic cameras, electronic still cameras, video cameras and the like have been conventionally proposed (see, for example, Patent Document 1). It is required in such an optical system to suppress fluctuation in angle of view upon focusing.

PRIOR ARTS LIST

Patent Document

Patent Literature 1: Japanese Laid-Open Patent Publication No. 2019-117419(A)

SUMMARY OF THE INVENTION

An optical system according to a first invention consists of a preceding lens group having a negative refractive power and a succeeding lens group having a positive refractive power, which are arranged in order from an object side along an optical axis, wherein the succeeding lens group comprises a focusing group having a positive refractive power which is arranged to be closest to an object in the succeeding lens group, and an image-side group which is arranged to be closer to an image than the focusing group, and the focusing group moves to an image side along the optical axis upon focusing on a short-distance object from an object at infinity to satisfy the following conditional expression:

$$0.78 < fB/fC < 1.00$$

where
fB: the focal length of the succeeding lens group upon focusing on infinity, and
fC: the focal length of the image-side group upon focusing on infinity.

An optical system according to a second invention consists of a preceding lens group having a negative refractive power and a succeeding lens group having a positive refractive power, which are arranged in order from an object side along an optical axis, wherein the succeeding lens group comprises a focusing group having a positive refractive power which is arranged to be closest to an object in the succeeding lens group, and an image-side group which is arranged to be closer to an image than the focusing group, and the focusing group moves to an image side along the optical axis upon focusing on a short-distance object from an object at infinity to satisfy the following conditional expression:

$$1.00 < \beta B/\beta C < 10.00$$

where
$\beta B$: the magnification of the succeeding lens group upon focusing on infinity, and
$\beta C$: the magnification of the image-side group upon focusing on infinity.

An optical apparatus according to the present invention is configured to comprise the optical system.

A method for manufacturing an optical system according to the present invention consisting of a preceding lens group having a negative refractive power and a succeeding lens group having a positive refractive power which are arranged in order from an object side along an optical axis, comprises a step of disposing the lens groups in a lens barrel so that; the succeeding lens group comprises a focusing group having a positive refractive power which is arranged to be closest to an object in the succeeding lens group, and an image-side group which is arranged to be closer to an image than the focusing group, and the focusing group moves to an image side along the optical axis upon focusing on a short-distance object from an object at infinity to satisfy the following conditional expression.

$$0.78 < fB/fC < 1.00$$

where
fB: a focal length of the succeeding lens group upon focusing on infinity, and
fC: a focal length of the image-side group upon focusing on infinity.

BRIEF DESCRIPTION OF THE DRAWINGS

FIG. 8 is a flowchart showing a method of manufacturing the optical system according to each of the embodiments.

DESCRIPTION OF THE EMBODIMENTS

Figure 7:
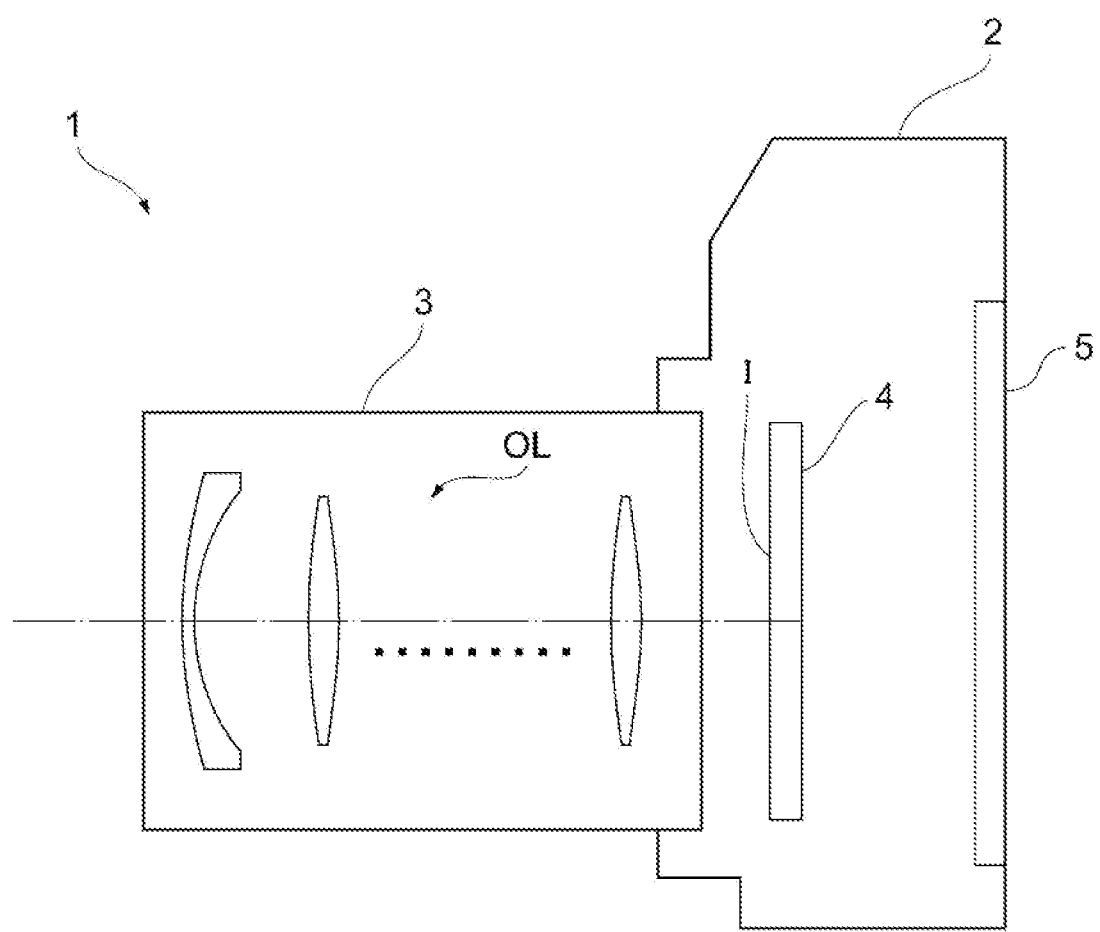
FIG. 7 is a diagram showing a configuration of a camera including the optical system according to each of embodiments.

Preferred embodiments according to the present invention will be hereinafter described. First, a camera (optical apparatus) including an optical system according to each of the embodiments will be described with reference to FIG. 7. As shown in FIG. 7, the camera 1 comprises a main body 2 and a photographing lens 3 to be mounted on the main body 2. The main body 2 includes an imaging element 4, a main body control part (not shown) for controlling the operation of a digital camera, and a liquid crystal screen 5. The photographing lens 3 includes an optical system OL consisting of a plurality of lens groups and a lens position control mechanism (not shown) for controlling the position of each lens group. The lens position control mechanism includes a sensor for detecting the positions of the lens groups, a motor for moving the lens groups back and forth along an optical axis, a control circuit for driving the motor, and the like.

Light from a subject is focused by the optical system OL of the photographing lens 3, and reaches an image surface I of the imaging element 4. The light from the subject that has reached the image surface I is photoelectrically converted by the imaging element 4, and recorded as digital image data in a memory (not shown). The digital image data recorded in the memory can be displayed on the liquid crystal screen 5 according to a user's operation. Note that this camera may be a mirrorless camera or a single-lens reflex camera having a quick return mirror.

Figure 1:
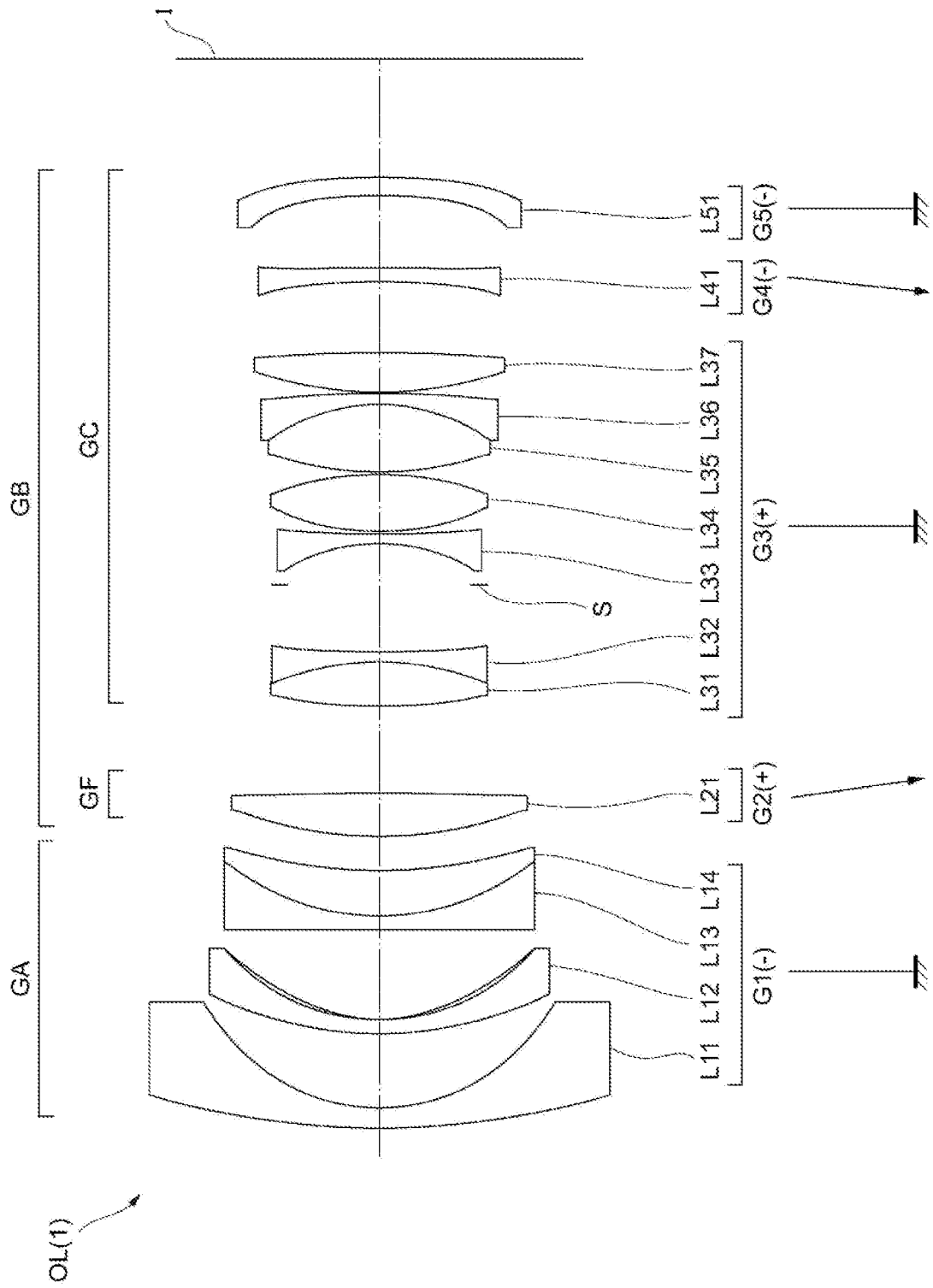
FIG. 1 is a diagram showing a lens configuration of an optical system according to a first example.

Next, an optical system according to a first embodiment will be described. As shown in FIG. 1, an optical system OL(1) as an example of the optical system (photographing lens) OL according to the first embodiment consists of a preceding lens group GA having a negative refractive power and a succeeding lens group GB having a positive refractive power which are arranged in order from an object side along the optical axis. The succeeding lens group GB comprises a focusing group GF having a positive refractive power which is arranged to be closest to an object in the succeeding lens group GB, and an image-side group GC which is arranged to be closer to an image than the focusing group GF. Upon focusing on a short-distance object from an object at infinity, the focusing group GF moves to the image side along the optical axis.

Under the above configuration, the optical system OL according to the first embodiment satisfies the following conditional expression (1):

$$0.78 < fB/fC < 1.00 \qquad (1),$$

where fB: the focal length of the succeeding lens group GB upon focusing on infinity, and fC: the focal length of the image-side group GC upon focusing on infinity.

According to the first embodiment, it is possible to obtain an optical system having less fluctuation in angle of view upon focusing, and an optical apparatus comprising this optical system. The optical system OL according to the first embodiment may be an optical system OL(2) shown in FIG. 3, or an optical system OL(3) shown in FIG. 5.

The conditional expression (1) defines an appropriate relationship between the focal length of the succeeding lens group GB upon focusing on infinity and the focal length of the image-side group GC upon focusing on infinity. By satisfying the conditional expression (1), it is possible to suppress the fluctuation in angle of view upon focusing.

If the corresponding value of the conditional expression (1) is out of the above range, it would be difficult to suppress the fluctuation in angle of view upon focusing. By setting the lower limit value of the conditional expression (1) to 0.79, 0.80, 0.81, 0.82, and further 0.83, the effect of the present embodiment can be more ensured. Further, by setting the upper limit value of the conditional expression (1) to 0.98, 0.96, 0.95, and further 0.94, the effect of the present embodiment can be more ensured.

It is desirable that the optical system OL according to the first embodiment satisfies the following conditional expression (2):

$$0.010 < BLDF/TL < 0.160 \qquad (2),$$

where the entire length of the optical system OL, and

BLDF: the length of the focusing group GF on the optical axis.

The conditional expression (2) defines an appropriate relationship between the length of the focusing group GF on the optical axis and the entire length of the optical system OL. By satisfying the conditional expression (2), it is possible to reduce the weight of the focusing group and perform high-speed focusing.

If the corresponding value of the conditional expression (2) is out of the above range, it would be difficult to reduce the weight of the focusing group. By setting the lower limit value of the conditional expression (2) to 0.015, 0.020, 0.023, 0.025, 0.028, 0.030, 0.033, and further 0.035, the effect of the present embodiment can be more ensured. Further, by setting the upper limit value of the conditional expression (2) to 0.150, 0.130, 0.110, 0.080, 0.060, and further 0.050, the effect of the present embodiment can be more ensured.

Next, an optical system according to a second embodiment will be described. As shown in FIG. 1, an optical system OL(1) as an example of the optical system (photographing lens) OL according to the second embodiment comprises a preceding lens group GA having a negative refractive power and a succeeding lens group GB having a positive refractive power which are arranged in order from an object side along an optical axis. The succeeding lens group GB includes a focusing group GF having a positive refractive power which is arranged to be closest to an object in the succeeding lens group GB, and an image-side group GC which is arranged to be closer to an image than the focusing group GF. Upon focusing on a short-distance object from an object at infinity, the focusing group GF moves to an image side along the optical axis.

Under the above configuration, the optical system OL according to the second embodiment satisfies the following conditional expression (3):

$$1.00 < \beta B/\beta PC < 10.00 \qquad (3),$$

where $\beta B$: the magnification of the succeeding lens group GB upon focusing on infinity, and $\beta C$: the magnification of the image-side group GC upon focusing on infinity.

According to the second embodiment, it is possible to obtain an optical system having less fluctuation in angle of view upon focusing, and an optical apparatus comprising this optical system. The optical system OL according to the second embodiment may be the optical system OL(2) shown in FIG. 3 or the optical system OL(3) shown in FIG. 5.

The conditional expression (3) defines an appropriate relationship between the magnification of the succeeding lens group GB upon focusing on infinity and the magnification of the image-side group GC upon focusing on infinity. By satisfying the conditional expression (3), it is possible to suppress the fluctuation in angle of view upon focusing.

If the corresponding value of the conditional expression (3) is out of the above range, it would be difficult to suppress the fluctuation in angle of view upon focusing. By setting the lower limit value of the conditional expression (3) to 1.40, 1.80, 2.20, 2.50, and further 2.60, the effect of the present embodiment can be more ensured. Further, by setting the upper limit value of the conditional expression (3) to 8.00, 7.50, 7.00, 6.50, 6.00, 5.50, 5.00, and further 4.50, the effect of the present embodiment can be more ensured.

It is desirable that the optical system OL according to the second embodiment satisfies the above-mentioned conditional expression (2). By satisfying the conditional expression (2), high-speed focusing can be performed as in the first embodiment. By setting the lower limit value of the conditional expression (2) to 0.015, 0.020, 0.023, 0.025, 0.028, 0.030, 0.033, and further 0.035, the effect of the present embodiment can be more ensured. Further, by setting the upper limit value of the conditional expression (2) to 0.150, 0.130, 0.110, 0.080, 0.060, and further 0.050, the effect of the present embodiment can be more ensured.

The optical system OL according to the second embodiment may satisfy the above-mentioned conditional expression (1). By satisfying the conditional expression (1), it is possible to suppress the fluctuation in angle of view upon focusing as in the first embodiment. By setting the lower limit value of the conditional expression (1) to 0.79, 0.80, 0.81, 0.82, and further 0.83, the effect of the second embodiment can be more ensured. Further, by setting the upper limit value of the conditional expression (1) to 0.98, 0.96, 0.95, and further 0.94, the effect of the second embodiment can be more ensured.

The optical system OL according to the first embodiment may satisfy the above-mentioned conditional expression (3). By satisfying the conditional expression (3), it is possible to suppress the fluctuation in angle of view upon focusing as in the second embodiment. By setting the lower limit value of the conditional expression (3) to 1.40, 1.80, 2.20, 2.50, and further 2.60, the effect of the first embodiment can be more ensured. Further, by setting the upper limit value of the conditional expression (3) to 8.00, 7.50, 7.00, 6.50, 6.00, 5.50, 5.00, and further 4.50, the effect of the first embodiment can be more ensured.

It is desirable that the optical systems OL according to the first embodiment and the second embodiment satisfy the following conditional expression (4):

$$0.50 < (-fA)/f < 1.50 \qquad (4)$$

where fA: the focal length of the preceding lens group GA, and f: the focal length of the optical system OL upon focusing on infinity.

The conditional expression (4) defines an appropriate relationship between the focal length of the preceding lens group GA and the focal length of the optical system OL upon focusing on infinity. By satisfying the conditional expression (4), various aberrations such as curvature of field can be excellently corrected.

If the corresponding value of the conditional expression (4) is out of the above range, it would be difficult to correct various aberrations such as curvature of field. By setting the lower limit value of the conditional expression (4) to 0.60, 0.70, 0.75, 0.80, 0.85, 0.90, 0.95, and further 0.98, the effect of each embodiment can be more ensured. Further, by setting the upper limit value of the conditional expression (4) to 1.45, 1.40, 1.35, 1.30, 1.25, 1.20, 1.18, and further 1.15, the effect of each embodiment can be more ensured.

It is desirable that the optical systems OL according to the first embodiment and the second embodiment satisfy the following conditional expression (5):

$$-3.00 < (rL1R2 + rL1R1)/(rL1R2 - rL1R1) < 0.00 \qquad (5)$$

where rL1R1: the radius of curvature of the lens surface on the object side of a lens which is arranged to be closest to the object in the optical system OL, and rL1R2: the radius of curvature of the lens surface on the image side of the lens which is arranged to be closest to the object in the optical system OL.

The conditional expression (5) defines an appropriate shape factor of the lens which is arranged to be closest to the object in the optical system OL. By satisfying the conditional expression (5), coma aberration and curvature of field can be excellently corrected.

If the corresponding value of the conditional expression (5) is out of the above range, it would be difficult to correct coma aberration and curvature of field. By setting the lower limit value of the conditional expression (5) to −2.70, −2.50, −2.30, −2.00, −1.80, and further −1.70, the effect of each embodiment can be more ensured. Further, by setting the upper limit value of the conditional expression (5) to −0.40, −0.60, −0.80, −1.00, −1.20, and further −1.30, the effect of each embodiment can be more ensured.

It is desirable that the optical systems OL according to the first embodiment and the second embodiment satisfy the following conditional expression (6):

$$-5.00 < (rL2R2 + rL2R1)/(rL2R2 - rL2R1) < -2.00 \qquad (6)$$

where rL2R1: the radius of curvature of the lens surface on the object side of a lens which is counted secondly from the object side and arranged in the optical system OL, and rL2R2: the radius of curvature of the lens surface on the image side of the lens which is counted secondly from the object side and arranged in the optical system OL.

The conditional expression (6) defines an appropriate shape factor of the lens which is counted secondly from the object side and arranged in the optical system OL. By satisfying the conditional expression (6), coma aberration and curvature of field can be excellently corrected.

If the corresponding value of the conditional expression (6) is out of the above range, it would be difficult to correct coma aberration and curvature of field. By setting the lower limit value of the conditional expression (6) to −4.80, −4.60, −4.50, −4.40, and further −4.30, the effect of each embodiment can be more ensured. Further, by setting the upper limit value of the conditional expression (6) to −2.20, −2.40, −2.50, −2.60, −2.70, and further −2.80, the effect of each embodiment can be more ensured.

It is desirable that the optical systems OL according to the first embodiment and the second embodiment satisfy the following conditional expression (7):

$$60.00° < 2\omega < 130.00° \qquad (7)$$

where

2ω: The full angle of view of the optical system OL upon focusing on infinity.

The conditional expression (7) defines an appropriate range of the full angle of view of the optical system OL upon focusing on infinity. The conditional expression (7) is preferable because an optical system having a wide angle of view can be obtained by satisfying the conditional expression (7). By setting the lower limit value of the conditional expression (7) to 64.00°, 68.00°, 72.00°, 76.00°, and further 80.00°, the effect of each embodiment can be more ensured. Further, by setting the upper limit value of the conditional expression (7) to 125.00°, 120.00°, 115.00°, 110.00°, and further 105.00°, the effect of each embodiment can be more ensured.

It is desirable that the optical systems OL according to the first embodiment and the second embodiment satisfy the following conditional expression (8):

$$1.20 < FNO < 3.00 \qquad (8)$$

where

FNO: F number of the optical system OL upon focusing on infinity.

The conditional expression (8) defines an appropriate range of the F number of the optical system OL upon focusing on infinity. The conditional expression (8) is preferable because a bright optical system can be obtained by satisfying the conditional expression (8). By setting the lower limit value of the conditional expression (8) to 1.25, 1.30, 1.40, 1.50, 1.60, 1.70, and further 1.75, the effect of each embodiment can be more ensured. Further, by setting the upper limit value of the conditional expression (8) to 2.80, 2.65, 2.50, 2.40, 2.30, and further 2.20, the effect of each embodiment can be more ensured.

In the optical systems OL according to the first embodiment and the second embodiment, it is desirable that an aperture stop S is arranged in the succeeding lens group GB and the following conditional expression (9) is satisfied:

$$0.35 < STL/TL < 0.70 \quad (9)$$

where
STL: the distance on the optical axis from the aperture stop S to the image surface I upon focusing on infinity, and
TL: the entire length of the optical system OL.

The conditional expression (9) defines an appropriate position of the aperture stop S. By satisfying the conditional expression (9), a peripheral light amount can be ensured.

If the corresponding value of the conditional expression (9) is out of the above range, it would be difficult to ensure the peripheral light amount. By setting the lower limit value of the conditional expression (9) to 0.38, 0.40, 0.42, 0.45, and further 0.48, the effect of each embodiment can be more ensured. Further, by setting the upper limit value of the conditional expression (9) to 0.68, 0.65, 0.63, 0.60, 0.58, and further 0.57, the effect of each embodiment can be more ensured.

It is desirable that the optical systems OL according to the first embodiment and the second embodiment satisfy the following conditional expression (10):

$$0.05 < Bf/TL < 0.30 \quad (10)$$

where
Bf: the back focus of the optical system OL, and
TL: the entire length of the optical system OL.

The conditional expression (10) defines an appropriate relationship between the back focus of the optical system OL and the entire length of the optical system OL. By satisfying the conditional expression (10), various aberrations such as curvature of field and distortion can be excellently corrected.

If the corresponding value of the conditional expression (10) is out of the above range, it would be difficult to correct various aberrations such as curvature of field and distortion. By setting the lower limit value of the conditional expression (10) to 0.06, 0.07, 0.08, 0.09, and further 0.10, the effect of each embodiment can be more ensured. Further, by setting the upper limit value of the conditional expression (10) to 0.27, 0.25, 0.23, 0.20, 0.18, 0.16, and further 0.15, the effect of each embodiment can be more ensured.

It is desirable that the optical systems OL according to the first embodiment and the second embodiment satisfy the following conditional expression (11):

$$1.50 < fF/f < 4.50 \quad (11)$$

where
fF: the focal length of the focusing group GF, and
f: the focal length of the optical system OL upon focusing on infinity.

The conditional expression (11) defines an appropriate relationship between the focal length of the focusing group GF and the focal length of the optical system OL upon focusing on infinity. By satisfying the conditional expression (11), excellent optical performance can be obtained both upon focusing on infinity and upon focusing on a short-distance object.

If the corresponding value of the conditional expression (11) is out of the above range, it would be difficult to obtain excellent optical performance both upon focusing on infinity and upon focusing on a short-distance object. By setting the lower limit value of the conditional expression (11) to 1.60, 1.80, 2.20, 2.30, 2.40, 2.45, 2.50, and further 2.55, the effect of each embodiment can be more ensured. Further, by setting the upper limit value of the conditional expression (11) to 4.20, 4.00, 3.80, 3.60, 3.50, 3.40, and further 3.30, the effect of each embodiment can be more ensured.

It is desirable that the optical systems OL according to the first embodiment and the second embodiment satisfy the following conditional expression (12):

$$1.00 < fF/fB < 3.00 \quad (12)$$

where
fF: the focal length of the focusing group GF, and
fB: the focal length of the succeeding lens group GB upon focusing on infinity.

The conditional expression (12) defines an appropriate relationship between the focal length of the focusing group GF and the focal length of the succeeding lens group GB upon focusing on infinity. By satisfying the conditional expression (12), excellent optical performance can be obtained both upon focusing on infinity and upon focusing on a short-distance object.

If the corresponding value of the conditional expression (12) is out of the above range, it would be difficult to obtain excellent optical performance both upon focusing on infinity and upon focusing on a short-distance object. By setting the lower limit value of the conditional expression (12) to 1.20, 1.30, 1.40, 1.50, 1.55, 1.60, and further 1.65, the effect of each embodiment can be more enhanced. Further, by setting the upper limit value of the conditional expression (12) to 2.80, 2.70, 2.60, 2.50, 2.40, 2.35, 2.30, 2.25, 2.20, and further 2.18, the effect of each embodiment can be more ensured.

It is desirable that the optical systems OL according to the first embodiment and the second embodiment satisfy the following conditional expression (13):

$$0.15 < dF/TL < 0.40 \quad (13)$$

where
dF: the distance on the optical axis from a lens surface closest to the object in the optical system OL to a lens surface closest to the object in the focusing group GF upon focusing on infinity, and
TL: the entire length of the optical system OL.

The conditional expression (13) defines an appropriate range of the distance on the optical axis from the lens surface closest to the object in the optical system OL to the lens surface closest to the object in the focusing group GF. The conditional expression (13) is preferable because the focusing group GF is arranged to be closer to the object in the optical system OL by satisfying the conditional expression (13). By setting the lower limit value of the conditional expression (13) to 0.18, 0.20, 0.22, and further 0.23, the effect of each embodiment can be more ensured. Further, by setting the upper limit value of the conditional expression (13) to 0.38, 0.35, 0.33, and further 0.30, the effect of each embodiment can be more ensured.

It is desirable that the optical systems OL according to the first embodiment and the second embodiment satisfy the following conditional expression (14):

$$0.00 < 1/\beta F < 0.60 \quad (14)$$

where

βF: the magnification of the focusing group GF upon focusing on infinity.

The conditional expression (14) defines an appropriate range of the magnification of the focusing group GF upon focusing on infinity. By satisfying the conditional expression (14), it is possible to suppress the fluctuation in angle of view upon focusing.

If the corresponding value of the conditional expression (14) is out of the above range, it would be difficult to suppress the fluctuation in angle of view upon focusing. By setting the lower limit value of the conditional expression (14) to 0.04, 0.05, 0.08, 0.10, 0.13, 0.15, 0.18, 0.20, and further 0.22, the effect of each embodiment can be more ensured. Further, by setting the upper limit value of the conditional expression (14) to 0.55, 0.53, 0.50, 0.48, 0.45, 0.42, 0.40, 0.38, and further 0.36, the effect of each embodiment can be more ensured.

It is desirable that the optical systems OL according to the first embodiment and the second embodiment satisfy the following conditional expression (15):

$$\{\beta F+(1/\beta F)\}^{-2}<0.18 \qquad (15)$$

where

βF: the magnification of the focusing group GF upon focusing on infinity.

The conditional expression (15) defines an appropriate range of the magnification of the focusing group GF upon focusing on infinity. By satisfying the conditional expression (15), it is possible to suppress the fluctuation in angle of view upon focusing.

If the corresponding value of the conditional expression (15) is out of the above range, it would be difficult to suppress the fluctuation in angle of view upon focusing. By setting the upper limit value of the conditional expression (15) to 0.16, 0.15, 0.14, 0.13, 0.12, and further 0.11, the effect of each embodiment can be more ensured.

Subsequently, a method for manufacturing the optical systems OL according to the first embodiment and the second embodiment will be outlined with reference to FIG. 8. First, the preceding lens group GA having a negative refractive power and the succeeding lens group GB having a positive refractive power are arranged in order from the object side along the optical axis (step ST1). Next, the focusing group GF having a positive refractive power is arranged to be closest to the object in the succeeding lens group GB, and the image-side group GC is arranged to be closer to the image than the focusing group GF in the succeeding lens group GB (step ST2). Next, the focusing group GF is configured to move to the image side along the optical axis upon focusing on a short-distance object from an object at infinity (step ST3). Then, in the case of the optical system OL according to the first embodiment, the respective lenses are arranged in a lens barrel so as to satisfy at least the above conditional expression (1) (step ST4). In the case of the optical system OL according to the second embodiment, the respective lenses are arranged in a lens barrel so as to satisfy at least the above conditional expression (3) (step ST4). According to such a manufacturing method, it is possible to manufacture an optical system having little fluctuation in angle of view upon focusing.

EXAMPLES

Figure 3:
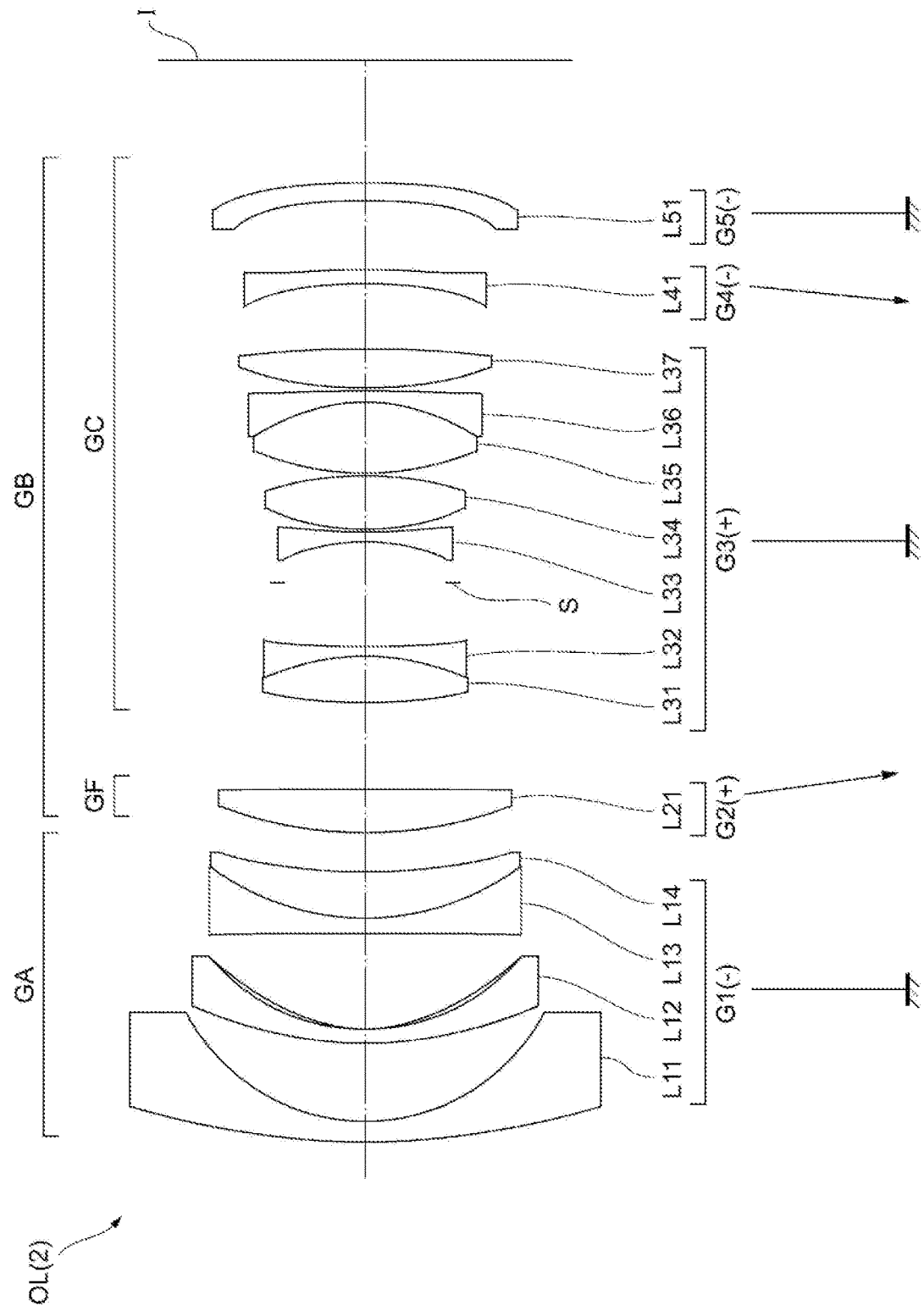
FIG. 3 is a diagram showing a lens configuration of an optical system according to a second example.
Figure 5:
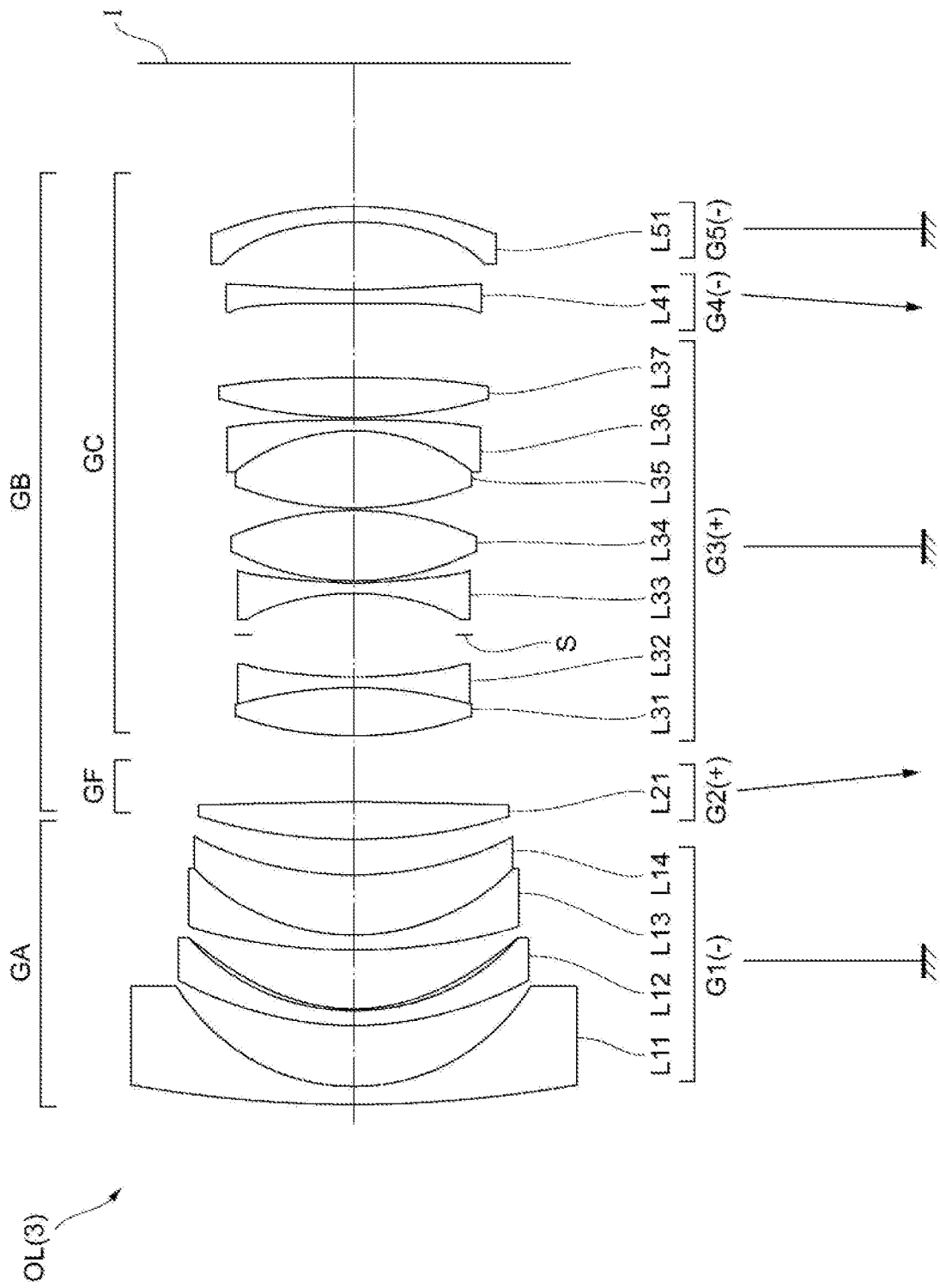
FIG. 5 is a diagram showing a lens configuration of an optical system according to a third example.

Optical systems OL according to examples of the respective embodiments will be hereinafter described with reference to the drawings. FIG. 1, FIG. 3, and FIG. 5 are cross-sectional views showing the configurations and refractive power distributions of the optical systems OL {OL(1) to OL(3)} according to first to third examples. In the cross-sectional views of the optical systems OL(1) to OL(3) according to the first to third examples, moving directions along the optical axis of the respective lens groups upon focusing on a short-distant object from infinity are indicated by arrows.

In FIGS. 1, 3, and 5, the respective lens groups and the respective groups are represented by combinations of character G and numerals, and the respective lenses are represented by combinations of character L and numerals. In this case, in order to prevent the types of characters and numerals and the numbers thereof from becoming large and complicated, the lens groups and the like are represented by independently using combinations of characters and numerals for each example. Therefore, even if the same combinations of characters and numerals are used among the examples, it does not mean that they have the same configuration.

Tables 1 to 3 are shown below. Table 1 is a table showing respective data of the first example, Table 2 is a table showing respective data of the second example, and Table 3 is a table showing respective data of the third example. In each example, d-line (wavelength λ=587.6 nm) and g-line (wavelength λ=435.8 nm) are selected as calculation targets of aberration characteristics.

In a table of [General Data], f represents the focal length of the entire lens system, FNO represents F number, 2ω represents an angle of view (the unit thereof is °(degree), and ω represents a half angle of view), and Y represents an image height. TL represents a distance obtained by adding BF to the distance from a frontmost lens surface to a final lens surface on the optical axis upon focusing on infinity, and BF represents the distance (back focus) from the final lens surface to the image surface I on the optical axis upon focusing on infinity. Further, in the table of [General Data], fA represents the focal length of the preceding lens group. fB represents the focal length of the succeeding lens group upon focusing on infinity. fC represents the focal length of the image-side group upon focusing on infinity. fF represents the focal length of the focusing group. βB represents the magnification of the succeeding lens group upon focusing on infinity. βC indicates the magnification of the image-side group upon focusing on infinity. βF indicates the magnification of the focusing group upon focusing on infinity.

In a table of [Lens data], surface numbers indicate the order of respective optical surfaces from the object side along the traveling direction of a light beam, R represents the radius of curvature of each optical surface (a positive value is set to a surface whose center of curvature is located on the image side), D represents a surface distance which is the distance on the optical axis from each optical surface to the next optical surface (or image surface), nd represents the refractive index of the material of an optical member for d-line, and vd represents an Abbe number of the material of the optical member based on d-line. "∞" of the radius of curvature represents a flat surface or an opening, and (aperture stop S) represents an aperture stop S. The description of the refractive index nd of air=1.00000 is omitted. When the optical surface is an aspherical surface, the surface number is marked with a sign of *, and a paraxial radius of curvature is shown in the column of the radius of curvature R.

In a table of [Aspherical Surface Data], the shape of the aspherical surface shown in [Lens Data] is represented by the following expression (A). X(y) represents the distance (sag amount) along the optical axis direction from the tangent plane at the apex of the aspherical surface to the position on the aspherical surface at the height y, R represents the radius of curvature (paraxial radius of curvature) of a reference sphere, κ represents a conic constant, and Ai represents an i-th order aspherical coefficient. "E−n" represents "×10$^{-n}$". For example, 1.234E−05=1.234×10$^{-5}$. A second-order aspherical coefficient A2 is equal to 0, and the description thereof is omitted.

$$X(y)=(y^2/R)/\{1+(1-\kappa \times y^2/R^2)\}+A4\times y^4+A6\times y^6+A8\times y^8+A10\times y^{10}+A12\times y^{12} \quad (A)$$

A table of [Variable Distance Data] shows a surface distance at a surface number i at which the surface distance is (Di) in the table of [Lens data]. In the table of [Variable Distance Data], f represents the focal length of the entire lens system, and β represents a photographing magnification.

A table of [Lens Group Data] shows the first surface (the surface closest to the object) and the focal length of each lens group.

Hereinafter, with respect to all the data values, "mm" is generally used for the focal length f, the radius of curvature R, the surface distance D, and other lengths, etc. described above unless otherwise specified, but the unit of the data values is not limited to "mm" because equivalent optical performance can be obtained in the optical system even when the optical system is expanded proportionally or reduced proportionally.

The foregoing descriptions on the tables are common to all the examples, and duplicate description is omitted in the following description First Example A first example will be described with reference to FIGS. 1 to 2A and 2B and Table 1. FIG. 1 is a diagram showing a lens configuration of an optical system according to the first example. The optical system OL (1) according to the first example comprises a first lens group G1 having a negative refractive power, a second lens group G2 having a positive refractive power, a third lens group G3 having a positive refractive power, a fourth lens group G4 having a negative refractive power, and a fifth lens group G5 having a negative refractive power which are arranged in order from the object side along the optical axis. Upon focusing on a short-distant object from an object at infinity, the second lens group G2 moves to the image side along the optical axis, and the fourth lens group G4 moves to the object side along the optical axis, so that the distance between the respective adjacent lens groups changes. Upon focusing, the first lens group G1, the third lens group G3, and the fifth lens group G5 are fixed with respect to the image surface I. The aperture stop S is arranged inside the third lens group G3. The sign (+) or (−) attached to each lens group symbol indicates the refractive power of each lens group, and this is true of all the following examples.

The first lens group G1 comprises a negative meniscus lens L11 having a convex surface facing an object, a negative meniscus lens L12 having a convex surface facing the object, and a cemented lens of a biconcave negative lens L13 and a positive meniscus lens L14 having a convex surface facing the object, which are arranged in order from the object side along the optical axis. The negative meniscus lens L12 is a hybrid type lens configured by providing a resin layer on an object-side surface of a glass lens body. An image-side surface of the resin layer is an aspherical surface, and the negative meniscus lens L12 is a composite type aspherical surface lens. In [Lens Data] described later, the surface number 3 indicates an object-side surface of the lens main body, the surface number 4 indicates an image-side surface of the lens main body and an object-side surface of the resin layer (a surface where both are joined), and the surface number 5 indicates an image-side surface of the resin layer.

The second lens group G2 comprises a biconvex positive lens L21.

The third lens group G3 comprises a cemented lens of a biconvex positive lens L31 and a biconcave negative lens L32, a biconcave negative lens L33, and a biconvex positive lens L34, a cemented lens of a biconvex positive lens L35 and a negative meniscus lens L36 having a concave surface facing the object, and a biconvex positive lens L37, which are arranged in order from the object side. An aperture stop S is arranged between the negative lens L32 and the negative lens L33 in the third lens group G3.

The fourth lens group G4 comprises a negative meniscus lens L41 having a concave surface facing the object. The negative meniscus lens L41 has aspherical lens surfaces on both sides thereof.

The fifth lens group G5 comprises a negative meniscus lens L51 having a concave surface facing the object. The image surface I is arranged on the image side of the fifth lens group G5. The negative meniscus lens L51 has aspherical lens surfaces on both sides thereof.

In the present example, the first lens group G1 constitutes a preceding lens group GA having a negative refractive power as a whole. The second lens group G2, the third lens group G3, the fourth lens group G4, and the fifth lens group G5 constitute a succeeding lens group GB having a positive refractive power as a whole. The second lens group G2 constitutes a focusing group GF in the succeeding lens group GB, and the third lens group G3, the fourth lens group G4, and the fifth lens group G5 constitute an image-side group GC in the succeeding lens group GB.

The following Table 1 lists the values of the data of the optical system according to the first example.

TABLE 1

[General Data]

| | |
|---|---|
| f = 19.752 | fA = −21.416 |
| FNO = 1.850 | fB = 32.742 |
| 2ω = 94.000 | fC = 36.880 |
| Y = 21.700 | fF = 54.915 |
| TL = 119.425 | βB = −0.922 |
| Bf = 13.307 | βC = − 0.223 |
| | βF = 4.143 |

[Lens Data]

| Surface Number | R | D | nd | vd |
|---|---|---|---|---|
| 1 | 95.9736 | 2.200 | 1.69680 | 55.53 |
| 2 | 22.7534 | 8.128 | | |
| 3 | 44.6575 | 1.550 | 1.77250 | 49.62 |
| 4 | 23.5501 | 0.050 | 1.51380 | 52.97 |
| 5* | 19.5320 | 10.056 | | |
| 6 | −2091.0337 | 1.600 | 1.49782 | 82.57 |
| 7 | 28.5475 | 5.100 | 1.95375 | 32.33 |
| 8 | 62.5330 | (D8) | | |
| 9 | 49.0421 | 4.800 | 1.80400 | 46.60 |
| 10 | −423.4257 | (D10) | | |
| 11 | 62.2274 | 5.000 | 1.95375 | 32.33 |
| 12 | −31.1515 | 1.100 | 1.84666 | 23.80 |
| 13 | 109.4389 | 7.476 | | |

TABLE 1-continued

| | | | | |
|---|---|---|---|---|
| 14 | ∞ | 4.522 | | (Aperture Stop S) |
| 15 | −21.9847 | 1.100 | 1.63980 | 34.55 |
| 16 | 180.9758 | 0.200 | | |
| 17 | 28.8999 | 6.500 | 1.49782 | 82.57 |
| 18 | −32.6652 | 0.200 | | |
| 19 | 40.2245 | 7.600 | 1.49782 | 82.57 |
| 20 | −21.1001 | 1.200 | 1.95375 | 32.33 |
| 21 | −133.5276 | 0.200 | | |
| 22 | 46.5098 | 4.369 | 1.96300 | 24.11 |
| 23 | −174.4889 | (D23) | | |
| 24* | −114.5192 | 1.600 | 1.86100 | 37.10 |
| 25* | −200.0000 | (D25) | | |
| 26* | −41.2363 | 2.000 | 1.86100 | 37.10 |
| 27* | −52.6527 | Bf | | |

[Aspherical Surface Data]

5th Surface

κ = 0.0000, A4 = 2.25913E−06, A6 = −1.46119E−09
A8 = −3.65260E−11, A10 = 7.29186E−14, A12 = −0.12250E−15

24th Surface

κ = 1.0000, A4 = −2.36949E−05, A6 = 4.59449E−08
A8 = −2.40149E−10, A10 = 4.37008E−14, A12 = 0.00000E+00

25th Surface

κ = 1.0000, A4 = 1.03885E−05, A6 = −1.05283E−08
A8 = 2.53730E−10, A10 = −2.36282E−12, A12 = 0.56556E−14

26th Surface

κ = 1.0000, A4 = 5.70338E−05, A6 = −5.96569E−07
A8 = 1.49791E−09, A10 = −2.21943E−12, A12 = 0.00000E+00

27th Surface

κ = 1.0000, A4 = 6.20655E−05, A6 = −5.08156E−07
A8 = 1.34161E−09, A10 = −1.31454E−12, A12 = 0.00000E+00

[Variable Distance Data]

| | Upon focusing on infinity | Upon focusing on an intermediate distance object | Upon focusing a very short distance object |
|---|---|---|---|
| | f = 19.7523 | β = −0.0324 | β = −0.1844 |
| Distance | ∞ | 583.6824 | 81.5339 |
| D8 | 3.83333 | 4.66117 | 8.49234 |
| D10 | 9.69148 | 8.86123 | 5.03506 |
| D23 | 7.98377 | 7.83192 | 7.06806 |
| D25 | 8.05896 | 8.21231 | 8.97413 |

[Lens Group Data]

| Group | First surface | Focal length |
|---|---|---|
| G1 | 1 | −21.416 |
| G2 | 9 | 4.915 |
| G3 | 11 | 33.632 |
| G4 | 24 | −313.917 |
| G5 | 26 | −240.369 |

Figure 2A:
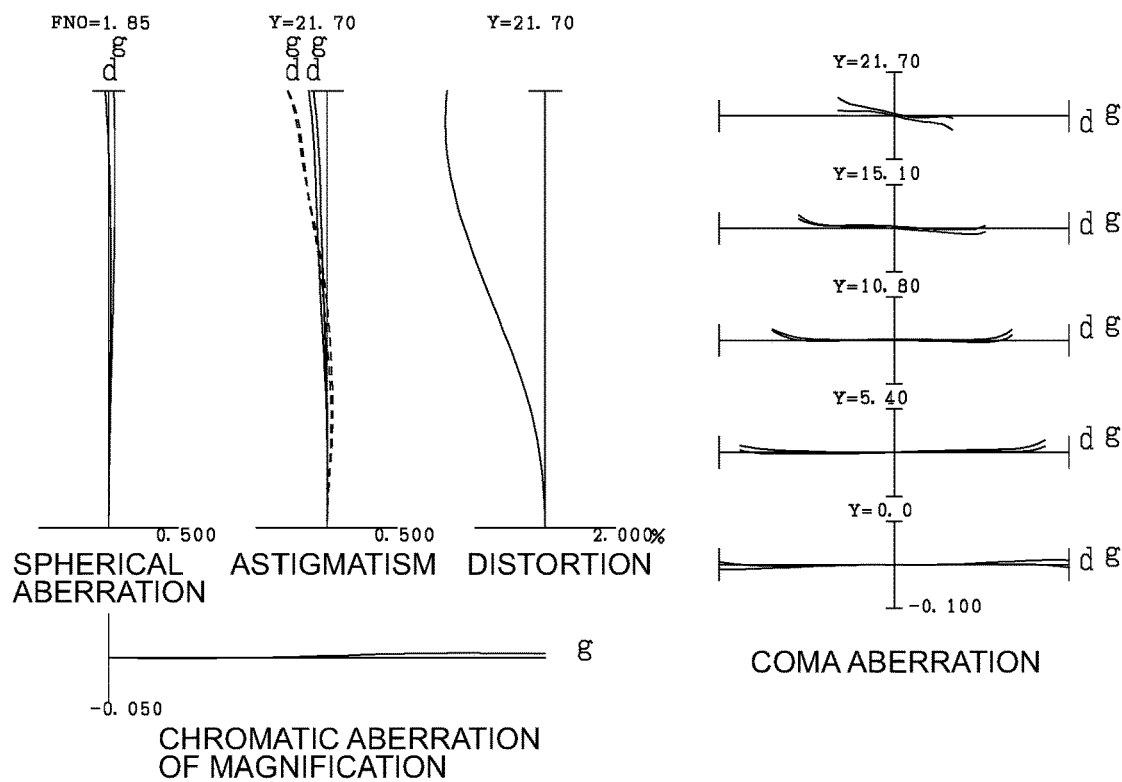
FIGS. 2A and 2B are aberration diagrams of the optical system according to the first example upon focusing on infinity and upon focusing on short-distance object, respectively.
Figure 2B:
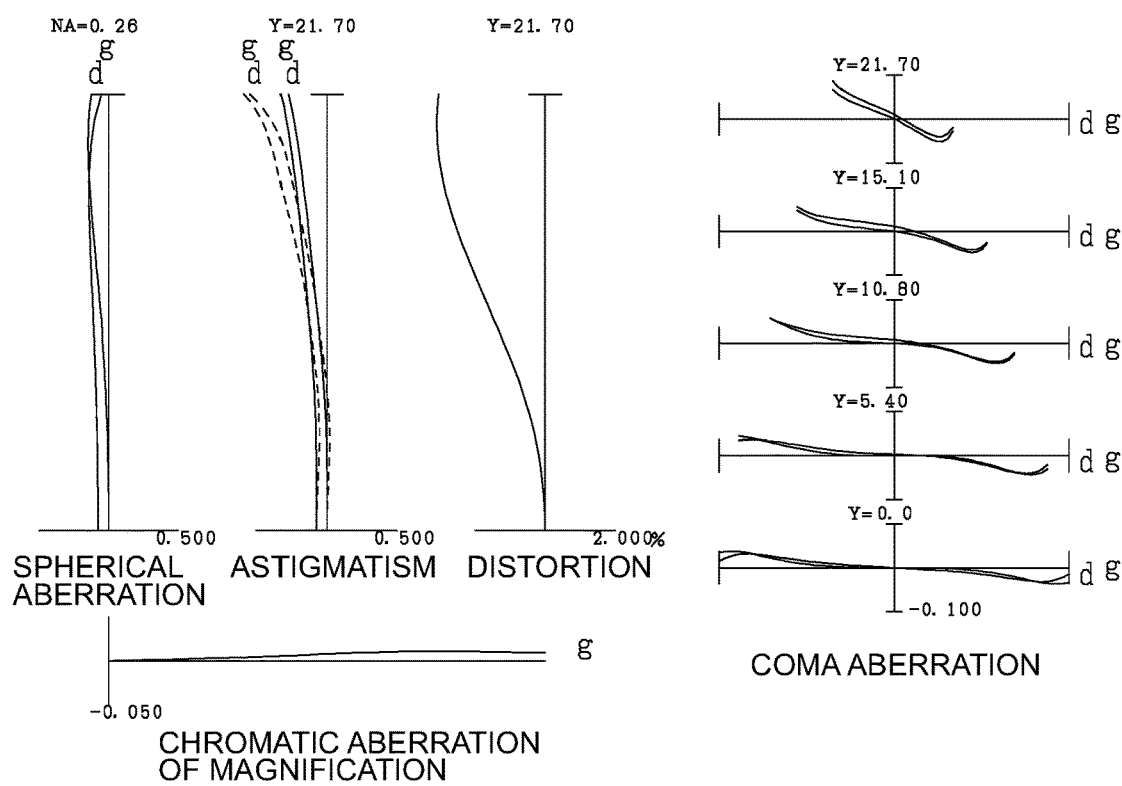

FIG. 2A is a diagram of various aberrations of the optical system according to the first example upon focusing on infinity. FIG. 2B is a diagram of various aberrations of the optical system according to the first example upon focusing on a short-distance object. In each aberration diagram upon focusing on infinity, FNO represents F number, and Y represents the image height. In each aberration diagram upon focusing on a short-distance object, NA represents the numerical aperture, and Y represents the image height. The F number or numerical aperture value corresponding to a maximum aperture are shown in a spherical aberration diagram, and the maximum value of an image height is shown in each of an astigmatism diagram and a distortion diagram, and the value of each image height is shown in a coma aberration diagram. Further, d represents d-line (wavelength λ=587.6 nm), and g represents g-line (wavelength λ=435.8 nm). In the astigmatism diagram, a solid line indicates a sagittal image surface, and a broken line indicates a meridional image surface. In the aberration diagrams of each example shown below, the same reference signs as those of the present example are used, and duplicate description thereof is omitted.

From each of the aberration diagrams, it is apparent that the optical system according to the first example is excellently corrected in various aberrations in the entire range from focusing on infinity to focusing on a short-distance object and has excellent imaging performance. Therefore, it is possible to suppress the fluctuation in angle of view upon focusing while maintaining excellent optical performance even upon focusing on a short-distance object.

Second Example

A second example will be described with reference to FIGS. 3 to 4A and 4B and Table 2. FIG. 3 is a diagram showing a lens configuration of an optical system according to the second example. The optical system OL(2) according to the second example comprises a first lens group G1 having a negative refractive power, a second lens group G2 having a positive refractive power, a third lens group G3 having a positive refractive power, a fourth lens group G4 having a negative refractive power, and a fifth lens group G5 having a negative refractive power, which are arranged in order from the object side along the optical axis. Upon focusing on a short-distant object from an object at infinity, the second lens group G2 moves to the image side along the optical axis, and the fourth lens group G4 moves to the object side along the optical axis, so that the distance between the respective adjacent lens groups changes. Upon focusing, the first lens group G1, the third lens group G3, and the fifth lens group G5 are fixed with respect to the image surface I. An aperture stop S is arranged inside the third lens group G3.

In the second example, the first lens group G1, the second lens group G2, the third lens group G3, the fourth lens group G4, and the fifth lens group G5 are configured in the same manner as the first example. The same reference signs as in the case of the first example are appended, and detailed description of each of these lenses will be omitted. In the present example, the first lens group G1 constitutes a preceding lens group GA having a negative refractive power as a whole. The second lens group G2, the third lens group G3, the fourth lens group G4, and the fifth lens group G5 constitute a succeeding lens group GB having a positive refractive power as a whole. The second lens group G2 constitutes a focusing group GF in the succeeding lens group GB, and the third lens group G3, the fourth lens group G4, and the fifth lens group G5 constitute an image-side group GC in the succeeding lens group GB.

The following Table 2 lists the values of the data of the optical system according to the second example.

TABLE 2

[General Data]

| | |
|---|---|
| f = 18.300 | fA = −20.673 |
| FNO = 2.040 | fB = 33.525 |
| 2ω = 100.000 | fC = 36.254 |
| Y = 21.700 | fF = 56.730 |

TABLE 2-continued

TL = 115.432  βB = −0.885
Bf = 13.305   βC = −0.228
              βF = 3.889

[Lens Data]

| Surface Number | R | D | nd | vd |
|---|---|---|---|---|
| 1 | 90.2277 | 2.200 | 1.69680 | 55.53 |
| 2 | 22.3259 | 8.564 | | |
| 3 | 46.5688 | 1.550 | 1.77250 | 49.62 |
| 4 | 22.8095 | 0.050 | 1.51380 | 52.97 |
| 5* | 18.7517 | 10.444 | | |
| 6 | −695.4342 | 1.600 | 1.49782 | 82.57 |
| 7 | 28.3462 | 5.100 | 1.95375 | 32.33 |
| 8 | 67.1568 | (D8) | | |
| 9 | 47.3685 | 4.800 | 1.80400 | 46.60 |
| 10 | −1173.5659 | (D10) | | |
| 11 | 57.0678 | 5.000 | 1.95375 | 32.33 |
| 12 | −28.3547 | 1.100 | 1.84666 | 23.80 |
| 13 | 124.7137 | 6.930 | | |
| 14 | ∞ | 4.437 | | (Aperture Stop S) |
| 15 | −21.8487 | 1.100 | 1.66464 | 34.18 |
| 16 | 83.7472 | 0.200 | | |
| 17 | 26.4652 | 6.000 | 1.49782 | 82.57 |
| 18 | −34.8619 | 0.200 | | |
| 19 | 32.6847 | 7.800 | 1.49782 | 82.57 |
| 20 | −21.1000 | 1.200 | 1.95481 | 31.10 |
| 21 | −238.7056 | 0.200 | | |
| 22 | 41.9717 | 4.400 | 1.96300 | 24.11 |
| 23 | −115.3109 | (D23) | | |
| 24* | −48.7305 | 1.600 | 1.86100 | 37.10 |
| 25* | −76.3867 | (D25) | | |
| 26* | −50.5083 | 2.000 | 1.86100 | 37.10 |
| 27* | −52.6316 | Bf | | |

[Aspherical Surface Data]

5th Surface

κ = 0.0000, A4 = 1.73336E−06, A6 = −5.18373E−09
A8 = −6.72613E−12, A10 = −1.17084E−14, A12 = −0.28865E−16

24th Surface

κ = 1.0000, A4 = −2.54179E−05, A6 = 1.75260E−07
A8 = −4.68333E−10, A10 = −2.00453E−12, A12 = 0.00000E+00

25th Surface

κ = 1.0000, A4 = 1.77608E−05, A6 = 9.96131E−08
A8 = 3.73519E−10, A10 = −6.29138E−12, A12 = 0.11757E−13

26th Surface

κ = 1.0000, A4 = 5.28778E−05, A6 = −4.96309E−07
A8 = 9.50586E−10, A10 = −1.55937E−12, A12 = 0.00000E+00

27th Surface

κ = 1.0000, A4 = 5.89841E−05, A6 = −4.03867E−07
A8 = 6.73316E−10, A10 = −1.78482E−13, A12 = 0.00000E+00

[Variable Distance Data]

| | Upon focusing on infinity | Upon focusing on an intermediate distance object | Upon focusing a very short distance object |
|---|---|---|---|
| | f = 18.3000 | β = −0.0300 | β = −0.1722 |
| Distance | ∞ | 585.1748 | 81.2627 |
| D8 | 4.34275 | 5.13609 | 8.85548 |
| D10 | 9.47662 | 8.68285 | 4.96440 |
| D23 | 7.13601 | 7.03337 | 6.49123 |
| D25 | 7.52933 | 7.63252 | 8.17487 |

TABLE 2-continued

[Lens Group Data]

| Group | First surface | Focal length |
|---|---|---|
| G1 | 1 | −20.673 |
| G2 | 9 | 56.730 |
| G3 | 11 | 32.335 |
| G4 | 24 | −160.622 |
| G5 | 26 | −2577.184 |

Figure 4A:
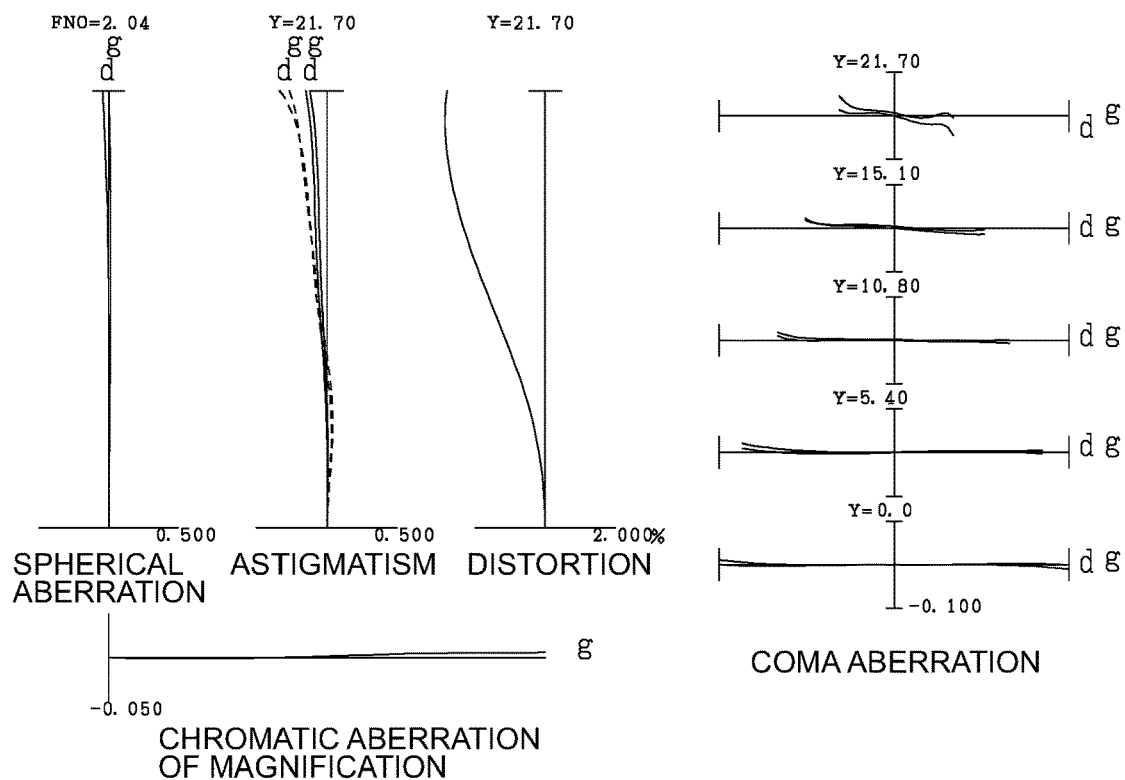
FIGS. 4A and 4B are aberration diagrams of the optical system according to the second example upon focusing on infinity and upon focusing on short-distance object, respectively.
Figure 4B:
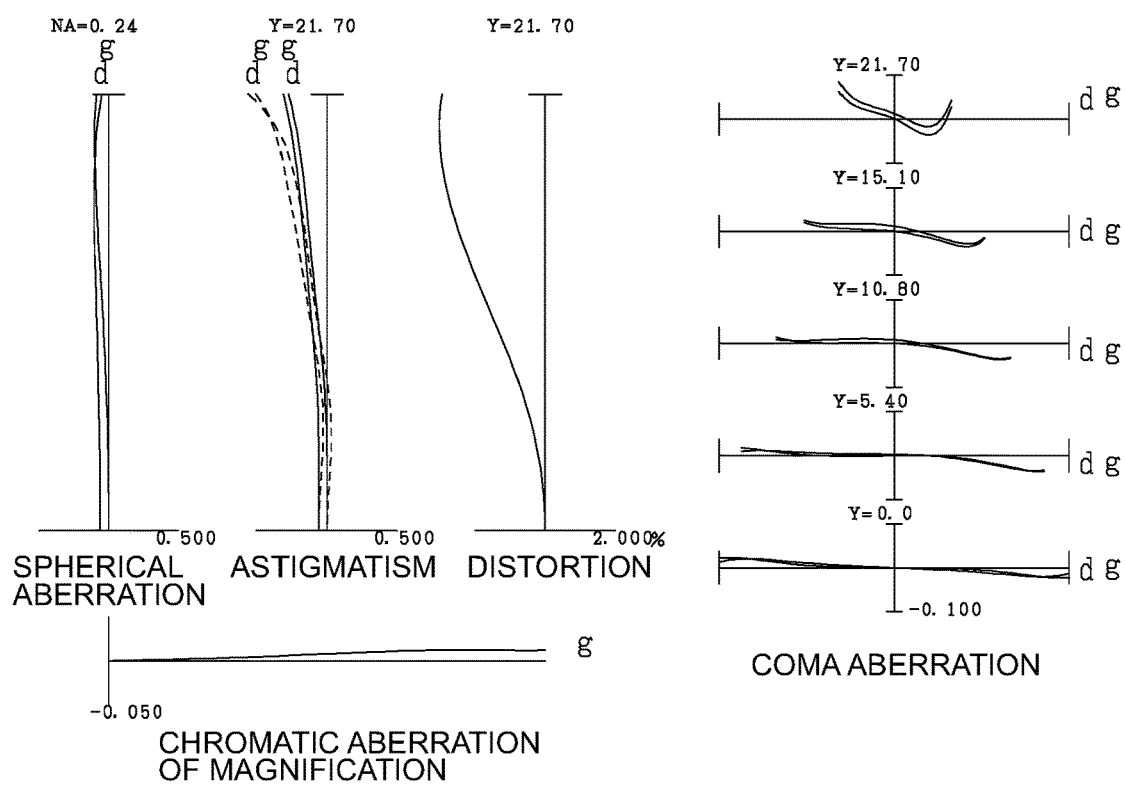

FIG. 4A is a diagram of various aberrations of the optical system according to the second example upon focusing on infinity. FIG. 4B is a diagram of various aberrations of the optical system according to the second example upon focusing on a short-distance object. From each of the aberration diagrams, it is apparent that the optical system according to the second example is excellently corrected in various aberrations in the entire range from focusing on infinity to focusing on a short-distance object and has excellent imaging performance. Therefore, it is possible to suppress the fluctuation in angle of view upon focusing while maintaining excellent optical performance even upon focusing on a short-distance object.

Third Example

A third example will be described with reference to FIGS. 5 to 6A and 6B and Table 3. FIG. 5 is a diagram showing a lens configuration upon focusing on infinity of the optical system according to the third example of the present embodiment. The optical system OL(3) according to the third example comprises a first lens group G1 having a negative refractive power, a second lens group G2 having a positive refractive power, a third lens group G3 having a positive refractive power, a fourth lens group G4 having a negative refractive power, and a fifth lens group G5 having a negative refractive power, which are arranged in order from the object side along the optical axis. Upon focusing on a short-distance object from an object at infinity, the second lens group G2 moves to the image side along the optical axis, and the fourth lens group G4 moves to the object side along the optical axis, so that the distance between the respective adjacent lens groups changes. Upon focusing, the first lens group G1, the third lens group G3, and the fifth lens group G5 are fixed with respect to the image surface I. An aperture stop S is arranged inside the third lens group G3.

The first lens group G1 comprises a negative meniscus lens L11 having a convex surface facing an object, a negative meniscus lens L12 having a convex surface facing the object, and a cemented lens of a negative meniscus lens L13 having a convex surface facing the object and a positive meniscus lens L14 having a convex surface facing the object, which are arranged in order from the object side along the optical axis. The negative meniscus lens L12 is a hybrid type lens configured by providing a resin layer on an object-side surface of a glass lens main body. An image-side surface of the resin layer is an aspherical surface, and the negative meniscus lens L12 is a composite type aspherical surface lens. In [Lens Data] described later, the surface number 3 indicates the object-side surface of the lens main body, the surface number 4 indicates an image-side surface of the lens main body and an object-side surface of the resin layer (a surface where both are joined), and the surface number 5 indicates an image-side surface of the resin layer.

The second lens group G2 comprises a biconvex positive lens L21.

The third lens group G3 comprises a cemented lens of a biconvex positive lens L31 and a biconcave negative lens L32, a biconcave negative lens L33, and a biconvex positive lens L34, a cemented lens of a biconvex positive lens L35 and a negative meniscus lens L36 having a concave surface facing the object, and a biconvex positive lens L37 which are arranged in order from the object side. An aperture stop S is arranged between the negative lens L32 and the negative lens L33 in the third lens group G3.

The fourth lens group G4 comprises a biconcave negative lens L41. The negative meniscus lens L41 has aspherical lens surfaces on both sides thereof.

The fifth lens group G5 comprises a negative meniscus lens L51 having a concave surface facing the object. The image surface I is arranged on the image side of the fifth lens group G5. The negative meniscus lens L51 has aspherical lens surfaces on both sides thereof.

In the present example, the first lens group G1 constitutes a preceding lens group GA having a negative refractive power as a whole. The second lens group G2, the third lens group G3, the fourth lens group G4, and the fifth lens group G5 constitute a succeeding lens group GB having a positive refractive power as a whole. The second lens group G2 constitutes a focusing group GF in the succeeding lens group GB, and the third lens group G3, the fourth lens group G4, and the fifth lens group G5 constitute an image-side group GC in the succeeding lens group GB.

The following Table 3 lists the values of the data of the optical system according to the third example.

TABLE 3

[General Data]

| | |
|---|---|
| f = 23.400 | fA = −24.637 |
| FNO = 1.850 | fB = 28.542 |
| 2ω = 84.000 | fC = 34.083 |
| Y = 21.700 | fF = 60.973 |
| TL = 108.428 | βB = −0.950 |
| Bf = 14.958 | βC = −0.327 |
| | βF = 2.902 |

[Lens Data]

| Surface Number | R | D | nd | vd |
|---|---|---|---|---|
| 1 | 142.4574 | 1.800 | 1.65844 | 50.83 |
| 2 | 21.6000 | 6.396 | | |
| 3 | 38.1000 | 1.550 | 1.51680 | 64.13 |
| 4 | 23.6120 | 0.050 | 1.51380 | 52.97 |
| 5* | 19.2059 | 6.142 | | |
| 6 | 63.1783 | 1.600 | 1.49782 | 82.57 |
| 7 | 23.3698 | 6.266 | 1.95000 | 29.37 |
| 8 | 36.0387 | (D8) | | |
| 9 | 54.5725 | 3.900 | 1.80400 | 46.60 |
| 10 | −466.6331 | (D10) | | |
| 11 | 39.5691 | 5.000 | 1.95375 | 32.33 |
| 12 | −40.6795 | 1.100 | 1.84666 | 23.80 |
| 13 | 54.0179 | 4.380 | | |
| 14 | ∞ | 4.408 | | (Aperture Stop S) |
| 15 | −24.1356 | 1.100 | 1.62004 | 36.40 |
| 16 | 75.2494 | 0.200 | | |
| 17 | 28.7803 | 7.300 | 1.49782 | 82.57 |
| 18 | −30.0589 | 0.200 | | |
| 19 | 35.1599 | 8.100 | 1.49782 | 82.57 |
| 20 | −19.4891 | 1.200 | 1.95375 | 32.33 |
| 21 | −97.0841 | 0.200 | | |
| 22 | 53.3925 | 4.200 | 1.96300 | 24.11 |
| 23 | −93.6556 | (D23) | | |
| 24* | −501.9657 | 1.400 | 1.86100 | 37.10 |
| 25* | 126.9062 | (D25) | | |
| 26* | −29.3391 | 1.600 | 1.86100 | 37.10 |
| 27* | −35.7143 | Bf | | |

[Aspherical Surface Data]

5th Surface

κ = 0.0000, A4 = 4.66669E−07, A6 = −6.88717E−09
A8 = −2.30899E−11, A10 = 5.43815E−14, A12 = −0.19200E−15

24th Surface

κ = 1.0000, A4 = −1.88541E−05, A6 = −8.03342E−08
A8 = 2.03164E−10, A10 = 1.24201E−12, A12 = −0.10143E−13

25th Surface

κ = 1.0000, A4 = 6.60646E−06, A6 = −1.50187E−07
A8 = 7.59419E−10, A10 = −1.80547E−12, A12 = −0.21528E−14

26th Surface

κ = 1.0000, A4 = 2.96788E−05, A6 = −5.54230E−07
A8 = 1.09418E−09, A10 = 8.51720E−13, A12 = 0.35278E−15

27th Surface

κ = 1.0000, A4 = 4.49265E−05, A6 = −4.55643E−07
A8 = 1.16960E−09, A10 = 1.42886E−12, A12 = −0.54944E−14

[Variable Distance Data]

| | Upon focusing on infinity | Upon focusing on an intermediate distance object | Upon focusing a very short distance object |
|---|---|---|---|
| | f = 23.4000 | β = −0.0397 | β = −0.1410 |
| Distance | ∞ | 562.7256 | 138.9454 |
| D8 | 3.68884 | 5.07863 | 8.66216 |
| D10 | 6.97027 | 5.57838 | 2.00000 |
| D23 | 7.70512 | 7.31418 | 6.15913 |
| D25 | 7.01357 | 7.40825 | 8.56537 |

[Lens Group Data]

| Group | First surface | Focal length |
|---|---|---|
| G1 | 1 | −24.637 |
| G2 | 9 | 60.973 |
| G3 | 11 | 29.756 |
| G4 | 24 | −117.529 |
| G5 | 26 | −215.972 |

Figure 6A:
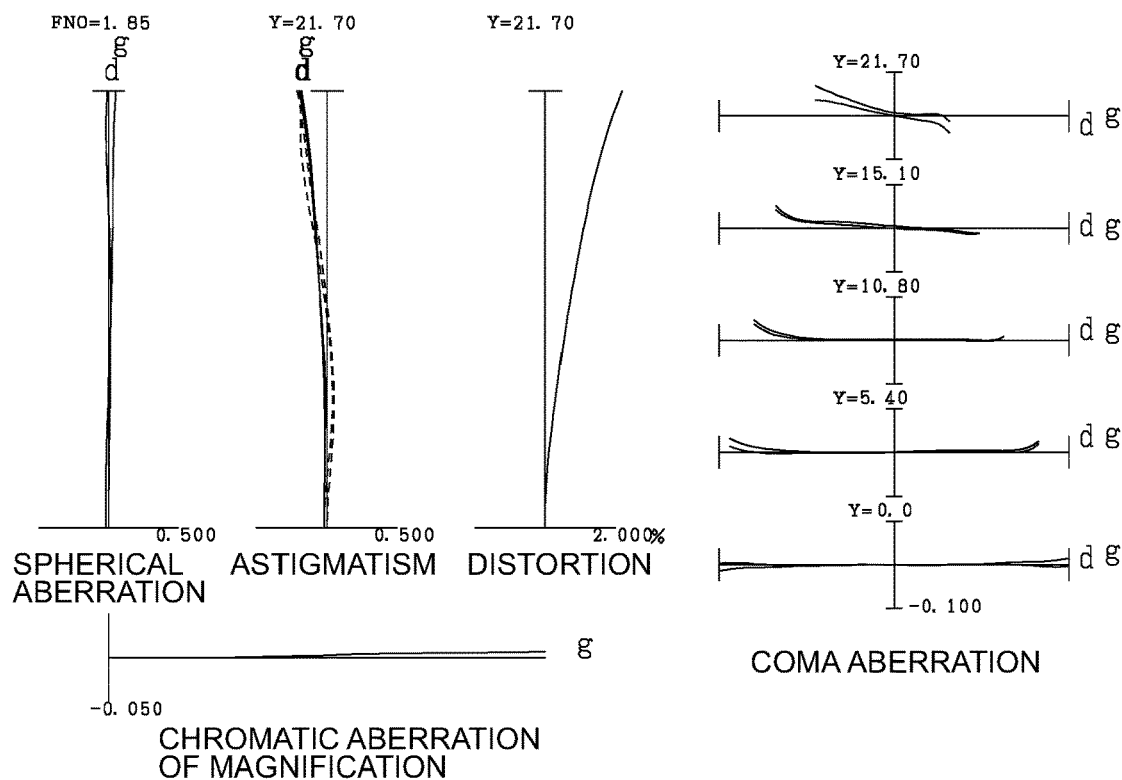
FIGS. 6A and 6B are aberration diagrams of the optical system according to the third example upon focusing on infinity and upon focusing on short-distance object, respectively.
Figure 6B:
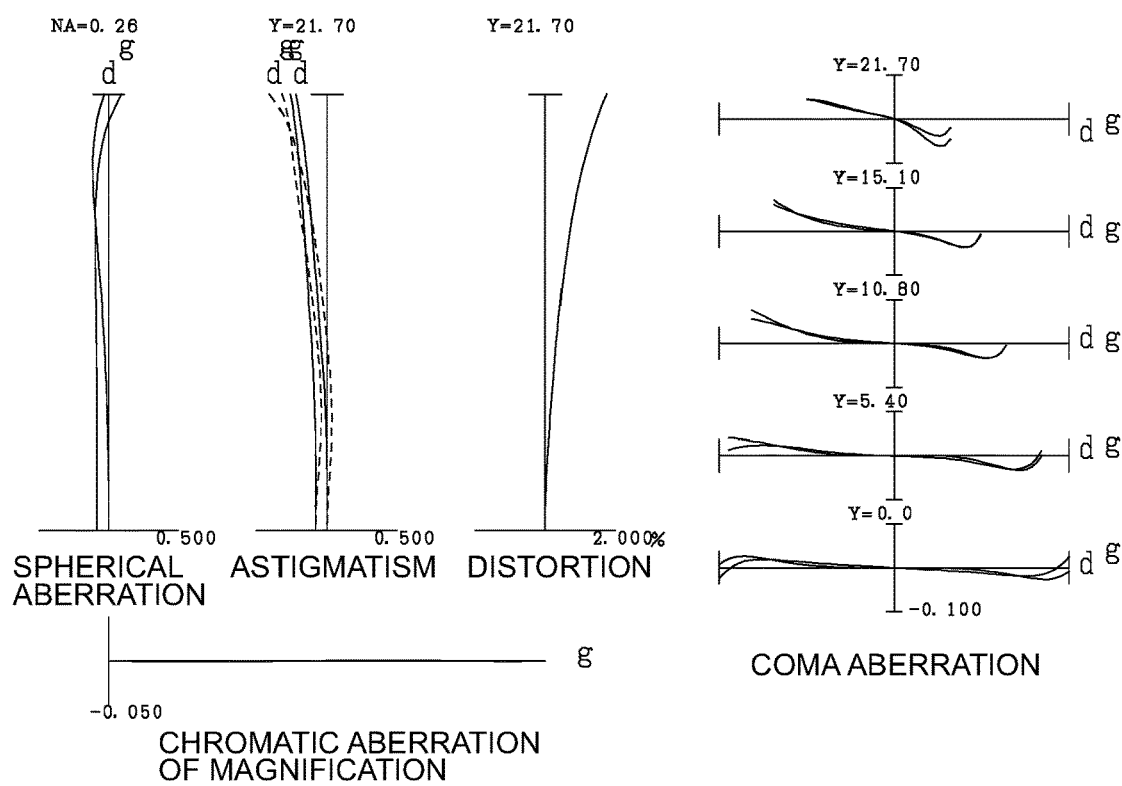

FIG. 6A is a diagram of various aberrations of the optical system according to the third example upon focusing on infinity. FIG. 6B is a diagram of various aberrations of the optical system according to the third example upon focusing on a short-distance object. From each of the aberration diagrams, it is apparent that the optical system according to the third example is excellently corrected in various aberrations in the entire range from focusing on infinity to focusing on a short-distance object and has excellent imaging performance. Therefore, it is possible to suppress the fluctuation in angle of view upon focusing while maintaining excellent optical performance even upon focusing on a short-distance object.

Next, a table of [Conditional Expression Corresponding Value] is shown below. In this table, the values corresponding to the respective conditional expressions (1) to (14) are collectively shown for all the examples (first to third examples).

| | |
|---|---|
| Conditional Expression (1) | 0.78 < fB/fC < 1.00 |
| Conditional Expression (2) | 0.010 < BLDF/TL < 0.160 |

-continued

| | |
|---|---|
| Conditional Expression (3) | $1.00 < \beta B/\beta C < 10.00$ |
| Conditional Expression (4) | $0.50 < (-fA)/f < 1.50$ |
| Conditional Expression (5) | $-3.00 < (rL1R2 + rL1R1)/(rL1R2 - rL1R1) < 0.00$ |
| Conditional Expression (6) | $-5.00 < (rL2R2 + rL2R1)/(rL2R2 - rL2R1) < -2.00$ |
| Conditional Expression (7) | $60.00° < 2\omega < 130.00°$ |
| Conditional Expression (8) | $1.20 < ENO < 3.00$ |
| Conditional Expression (9) | $0.35 < STL/TL < 0.70$ |
| Conditional Expression (10) | $0.05 < Bf/TL < 0.30$ |
| Conditional Expression (11) | $1.50 < fF/f < 4.50$ |
| Conditional Expression (12) | $1.00 < fF/fB < 3.00$ |
| Conditional Expression (13) | $0.15 < dF/TL < 0.40$ |
| Conditional Expression (14) | $0.00 < 1/\beta F < 0.60$ |
| Conditional Expression (15) | $\{\beta F + (1/\beta F)\}^{-2} < 0.18$ |

[Conditional Expression Corresponding Value]

| Conditional Expression | First Example | Second Example | Third Example |
|---|---|---|---|
| (1) | 0.888 | 0.925 | 0.837 |
| (2) | 0.040 | 0.042 | 0.036 |
| (3) | 4.143 | 3.889 | 2.902 |
| (4) | 1.084 | 1.130 | 1.053 |
| (5) | −1.622 | −1.658 | −1.357 |
| (6) | −3.231 | −2.920 | −4.260 |
| (7) | 94.000 | 100.000 | 84.000 |
| (8) | 1.850 | 2.040 | 1.850 |
| (9) | 0.493 | 0.511 | 0.550 |
| (10) | 0.111 | 0.115 | 0.138 |
| (11) | 2.780 | 3.100 | 2.606 |
| (12) | 1.677 | 1.692 | 2.136 |
| (13) | 0.272 | 0.293 | 0.254 |
| (14) | 0.241 | 0.257 | 0.345 |
| (15) | 0.052 | 0.058 | 0.095 |

According to each of the above examples, it is possible to implement an optical system having less fluctuation in angle of view upon focusing.

Each of the above-mentioned examples shows a specific example of the invention of the present application, and the invention of the present application is not limited to these examples.

The following contents can be appropriately adopted as long as the optical performance of the optical system of the present embodiment is not impaired.

Examples having a five-group configuration are shown as the examples of the optical system of the present embodiment. However, the present application is not limited to this configuration, and a variable power optical system having another group configuration (for example, six-group configuration or the like) can also be configured. Specifically, a lens or a lens group may be added to be closest to the object or the image surface in the optical system of the present embodiment. Note that the lens group represents a portion having at least one lens which is separated at an air distance changing upon focusing.

The lens group may be configured as a vibration-proof lens group in which a lens group or a partial lens group is moved so as to have a component in a direction perpendicular to the optical axis or is rotationally moved (swung) in an in-plane direction including the optical axis to correct image blur caused by camera shake.

The lens surface may be formed of a spherical surface or a flat surface, or may be formed of an aspherical surface. In the case where the lens surface is a spherical surface or a flat surface, this is preferable because lens processing and assembly adjustment are facilitated, so that deterioration in optical performance caused by errors of the processing and assembly adjustment can be prevented, and this is also preferable because deterioration of depiction performance is little even when the image surface is displaced.

In the case where the lens surface is an aspherical surface, the aspherical surface may be any one of an aspherical surface formed by grinding, a glass mold aspherical surface formed by forming glass into an aspherical surface shape, and a composite type aspherical surface formed by forming resin in an aspherical surface shape on the surface of glass. Further, the lens surface may be a diffraction surface, and the lens may be a refractive index distribution type lens (GRIN lens) or a plastic lens.

It is preferable that the aperture stop is arranged inside the third lens group, but the role thereof may be performed by using the frame of the lens without providing any member serving as the aperture stop.

Each lens surface may be provided with an antireflection film having high transmittance in a wide wavelength range in order to reduce flare and ghost and achieve high contrast optical performance.

EXPLANATION OF NUMERALS AND CHARACTERS

| | |
|---|---|
| G1 first lens group | G2 second lens group |
| G3 third lens group | G4 fourth lens group |
| G5 fifth lens group | |
| I image surface | S aperture stop |

The invention claimed is:

1. An optical system consisting of a preceding lens group having a negative refractive power and a succeeding lens group having a positive refractive power which are arranged in order from an object side along an optical axis,
    wherein the succeeding lens group comprises a focusing group having a positive refractive power which is arranged to be closest to an object in the succeeding lens group, and an image-side group which is arranged to be closer to an image than the focusing group, and the focusing group moves to an image side along the optical axis upon focusing on a short-distance object from an object at infinity, and
    the following conditional expressions are satisfied:

$$0.78 < fB/fC < 1.00$$

$$1.20 < FNO < 3.00$$

where
    fB: a focal length of the succeeding lens group upon focusing on infinity,
    fC: a focal length of the image-side group upon focusing on infinity, and
    FNO: F number of the optical system upon focusing on infinity.

2. The optical system according to claim 1, wherein the following conditional expression is satisfied:

$$0.010 < BLDF/TL < 0.160$$

where
    TL: an entire length of the optical system and
    BLDF: a length of the focusing group on the optical axis.

3. The optical system according to claim 1, wherein the following conditional expression is satisfied:

$$-3.00 < (rL1R2 + rL1R1)/(rL1R2 - rL1R1) < 0.00$$

where
rL1R1: radius of curvature of a lens surface on the object side of a lens which is arranged to be closest to the object in the optical system, and
rL1R2: radius of curvature of a lens surface on an image side of the lens which is arranged to be closest to the object in the optical system.

4. The optical system according to claim 1, wherein the following conditional expression is satisfied:

$$-5.00 < (rL2R2 + rL2R1)/(rL2R2 - rL2R1) < -2.00$$

where
rL2R1: radius of curvature of a lens surface on the object side of a lens which is second from the object side in the optical system, and
rL2R2: radius of curvature of a lens surface on the image side of the lens which is second from the object side in the optical system.

5. The optical system according to claim 1, wherein the following conditional expression is satisfied:

$$60.00° < 2\omega < 130.00°$$

where
2ω: a full angle of view of the optical system upon focusing on infinity.

6. The optical system according to claim 1, wherein the following conditional expression is satisfied:

$$0.05 < Bf/TL < 0.30$$

where
Bf: a back focus of the optical system, and
TL: an entire length of the optical system.

7. The optical system according to claim 1, wherein the following conditional expression is satisfied:

$$1.00 < fF/fB < 3.00$$

where
fF: a focal length of the focusing group.

8. The optical system according to claim 1, wherein the following conditional expression is satisfied:

$$0.15 < dF/TL < 0.40$$

where
dF: a distance on the optical axis from a lens surface closest to the object in the optical system to a lens surface closest to the object in the focusing group upon focusing on infinity, and
TL: an entire length of the optical system.

9. The optical system according to claim 1, wherein the following conditional expression is satisfied:

$$0.00 < 1/\beta F < 0.60$$

where
βF: magnification of the focusing group upon focusing on infinity.

10. The optical system according to claim 1, wherein the following conditional expression is satisfied:

$$\{\beta F + (1/\beta F)\}^{-2} < 0.18$$

where
βF: magnification of the focusing group upon focusing on infinity.

11. An optical apparatus comprising the optical system according to claim 1.

12. An optical system consisting of a preceding lens group having a negative refractive power and a succeeding lens group having a positive refractive power, which are arranged in order from the object side along an optical axis,
wherein the succeeding lens group comprises a focusing group having a positive refractive power which is arranged to be closest to an object in the succeeding lens group, and an image-side group which is arranged to be closer to an image than the focusing group, and the focusing group moves to an image side along the optical axis upon focusing on a short-distance object from an object at infinity, and
the following conditional expression is satisfied:

$$1.00 < \beta B/\beta C < 10.00$$

where
βB: magnification of the succeeding lens group upon focusing on infinity, and
βC: magnification of the image-side group upon focusing on infinity.

13. The optical system according to claim 12, wherein the following conditional expression is satisfied:

$$0.010 < BLDF/TL < 0.160$$

where
TL: an entire length of the optical system and
BLDF: a length of the focusing group on the optical axis.

14. The optical system according to claim 12, wherein the following conditional expression is satisfied:

$$0.50 < (-fA)/f < 1.50$$

where
fA: a focal length of the preceding lens group and
f: a focal length of the optical system upon focusing on infinity.

15. The optical system according to claim 12, wherein the following conditional expression is satisfied:

$$60.00° < 2\omega < 130.00°$$

where
2ω: a full angle of view of the optical system upon focusing on infinity.

16. The optical system according to claim 12, wherein an aperture stop is arranged in the succeeding lens group, and the following conditional expression is satisfied:

$$0.35 < STL/TL < 0.70$$

where
STL: a distance on the optical axis from the aperture stop to an image surface upon focusing on infinity, and
TL: an entire length of the optical system.

17. The optical system according to claim 12, wherein the following conditional expression is satisfied:

$$0.05 < Bf/TL < 0.30$$

where
Bf: a back focus of the optical system, and
TL: an entire length of the optical system.

18. The optical system according to claim 12, wherein the following conditional expression is satisfied:

$$1.50 < fF/f < 4.50$$

where
fF: a focal length of the focusing group, and
f: a focal length of the optical system upon focusing on infinity.

19. The optical system according to claim 12, wherein the following conditional expression is satisfied:

$$1.00 < fF/fB < 3.00$$

where
fF: a focal length of the focusing group, and
fB: a focal length of the succeeding lens group upon focusing on infinity.

20. The optical system according to claim 12, wherein the following conditional expression is satisfied:

$$0.15 < dF/TL < 0.40$$

where
dF: a distance on the optical axis from a lens surface closest to the object in the optical system to a lens surface closest to the object in the focusing group upon focusing on infinity, and
TL: an entire length of the optical system.

21. An optical apparatus configured to comprise the optical system according to claim 12.

22. A method for manufacturing an optical system consisting of a preceding lens group having a negative refractive power and a succeeding lens group having a positive refractive power which are arranged in order from an object side along an optical axis,
the method comprising a step of disposing the lens groups in a lens barrel such that:
the succeeding lens group comprises a focusing group having a positive refractive power which is arranged to be closest to an object in the succeeding lens group, and an image-side group which is arranged to be closer to an image than the focusing group, and
the focusing group moves to an image side along the optical axis upon focusing on a short-distance object from an object at infinity,
the method further comprising any of the following features (A), (B), or (C):
(A) satisfying the following conditional expressions:

$$0.78 < fB/fC < 1.00$$

$$1.20 < FNO < 3.00$$

where
fB: a focal length of the succeeding lens group upon focusing on infinity,
fC: a focal length of the image-side group upon focusing on infinity, and
FNO: F number of the optical system upon focusing on infinity,
(B) satisfying the following conditional expression:

$$1.00 < \beta B/\beta C < 10.00$$

where
βB: magnification of the succeeding lens group upon focusing on infinity, and
βC: magnification of the image-side group upon focusing on infinity,
(C) arranging an aperture stop in the succeeding lens group, and satisfying the following conditional expressions:

$$0.78 < fB/fC < 1.00$$

$$0.35 < STL/TL < 0.70$$

where
EB: the focal length of the succeeding lens group upon focusing on infinity,
fC: the focal length of the image-side group upon focusing on infinity,
STL: a distance on the optical axis from the aperture stop to an image surface upon focusing on infinity, and
TL: an entire length of the optical system.

23. An optical system consisting of a preceding lens group having a negative refractive power and a succeeding lens group having a positive refractive power which are arranged in order from an object side along an optical axis,
wherein the succeeding lens group comprises a focusing group having a positive refractive power which is arranged to be closest to an object in the succeeding lens group, and an image-side group which is arranged to be closer to an image than the focusing group, and
the focusing group moves to an image side along the optical axis upon focusing on a short-distance object from an object at infinity,
an aperture stop is arranged in the succeeding lens group, and
the following conditional expressions are satisfied:

$$0.78 < fB/fC < 1.00$$

$$0.35 < STL/TL < 0.70$$

where
fB: a focal length of the succeeding lens group upon focusing on infinity,
fC: a focal length of the image-side group upon focusing on infinity,
STL: a distance on the optical axis from the aperture stop to an image surface upon focusing on infinity, and
TL: an entire length of the optical system.

24. The optical system according to claim 23, wherein the following conditional expression is satisfied:

$$0.50 < (-fA)/f < 1.50$$

where
fA: a focal length of the preceding lens group and
f: a focal length of the optical system upon focusing on infinity.

25. The optical system according to claim 23, wherein the following conditional expression is satisfied:

$$1.50 < fF/f < 4.50$$

where
fF: a focal length of the focusing group, and
f: a focal length of the optical system upon focusing on infinity.

26. The optical system according to claim 23, wherein the following conditional expression is satisfied:

$$0.010 < BLDF/TL < 0.160$$

where
TL: an entire length of the optical system and
BLDF: a length of the focusing group on the optical axis.

27. The optical system according to claim 23, wherein the following conditional expression is satisfied:

$$-3.00 < (rL1R2+rL1R1)/(rL1R2-rL1R1) < 0.00$$

where
rL1R1: radius of curvature of a lens surface on the object side of a lens which is arranged to be closest to the object in the optical system, and
rL1R2: radius of curvature of a lens surface on an image side of the lens which is arranged to be closest to the object in the optical system.

28. An optical apparatus comprising the optical system according to claim 23.

* * * * *